United States Patent
Dastoor et al.

(10) Patent No.: US 11,084,396 B2
(45) Date of Patent: Aug. 10, 2021

(54) LIGHT ELECTRIC VEHICLE THAT SUPPORTS THE WEIGHT OF A USER

(71) Applicant: Neutron Holdings, Inc., San Francisco, CA (US)

(72) Inventors: Sanjay Dastoor, San Francisco, CA (US); John Ulmen, San Francisco, CA (US); Salomon Trujillo, San Francisco, CA (US); Matthew Tran, San Francisco, CA (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 0 days.

(21) Appl. No.: 16/739,520

(22) Filed: Jan. 10, 2020

(65) Prior Publication Data
US 2020/0148063 A1    May 14, 2020

Related U.S. Application Data

(63) Continuation of application No. 15/601,938, filed on May 22, 2017, which is a continuation of application
(Continued)

(51) Int. Cl.
*B60L 9/00*    (2019.01)
*B60L 11/00*    (2006.01)
(Continued)

(52) U.S. Cl.
CPC .............. *B60L 58/12* (2019.02); *B60L 1/00* (2013.01); *B60L 3/102* (2013.01); *B60L 3/12* (2013.01);
(Continued)

(58) Field of Classification Search
CPC ........ B60L 15/20; B60L 15/2045; B60L 1/00; B60L 2240/12; B60L 2240/20;
(Continued)

(56) References Cited

U.S. PATENT DOCUMENTS

| 4,069,881 A | 1/1978 | Shiber |
| 5,048,632 A | 9/1991 | Battel |

(Continued)

FOREIGN PATENT DOCUMENTS

| CN | 202923418 U | 5/2013 |
| EP | 0870641 A2 | 10/1998 |

OTHER PUBLICATIONS

Office Action of European Patent Office in Appl'n No. 14769572.0, dated Dec. 21, 2020.
U.S. Appl. No. 15/601,938, filed May 22, 2017.

*Primary Examiner* — Harry Y Oh
(74) *Attorney, Agent, or Firm* — Dentons US LLP

(57) ABSTRACT

A method for a light electric vehicle that supports a weight of a user that includes the steps of supplying a support surface to support the weight of a user; supplying a motor controller containing a processor to control operation of an electric motor mounted i) on the support surface, or ii) proximal to the support surface, where the motor controller and its processor are electrically connected to the rechargeable electric battery, where the electric motor is electrically connected to the motor controller and the rechargeable electric battery, as well as connected to a drive mechanism to drive one or more wheels; and supplying a mode selector to set a first riding-experience mode for the light electric vehicle, wherein the first riding-experience mode has a first acceleration maximum and a second riding experience mode has a second acceleration maximum.

14 Claims, 10 Drawing Sheets

Related U.S. Application Data

No. 15/189,213, filed on Jun. 22, 2016, now abandoned, which is a continuation of application No. 14/994,506, filed on Jan. 13, 2016, now Pat. No. 9,399,406, which is a continuation of application No. 14/212,606, filed on Mar. 14, 2014, now Pat. No. 9,266,445.

(60) Provisional application No. 61/785,543, filed on Mar. 14, 2013.

(51) Int. Cl.

| | | |
|---|---|---|
| *G05D 1/00* | (2006.01) | |
| *G05D 3/00* | (2006.01) | |
| *B60L 58/12* | (2019.01) | |
| *B60L 15/20* | (2006.01) | |
| *B60L 3/10* | (2006.01) | |
| *B60L 50/51* | (2019.01) | |
| *B60L 58/22* | (2019.01) | |
| *B60L 50/30* | (2019.01) | |
| *B60L 50/52* | (2019.01) | |
| *B60L 58/30* | (2019.01) | |
| *B60L 1/00* | (2006.01) | |
| *B60L 3/12* | (2006.01) | |

(52) U.S. Cl.
CPC ........... *B60L 15/20* (2013.01); *B60L 15/2045* (2013.01); *B60L 50/30* (2019.02); *B60L 50/51* (2019.02); *B60L 50/52* (2019.02); *B60L 58/22* (2019.02); *B60L 58/30* (2019.02); *B60L 2240/12* (2013.01); *B60L 2240/20* (2013.01); *B60L 2240/421* (2013.01); *B60L 2240/423* (2013.01); *B60L 2240/461* (2013.01); *B60L 2240/622* (2013.01); *B60L 2240/662* (2013.01); *B60L 2240/665* (2013.01); *B60L 2270/145* (2013.01); *Y02T 10/64* (2013.01); *Y02T 10/70* (2013.01); *Y02T 10/72* (2013.01); *Y02T 90/16* (2013.01); *Y02T 90/40* (2013.01)

(58) Field of Classification Search
CPC ......... B60L 2240/421; B60L 2240/423; B60L 2240/461; B60L 2240/622; B60L 2240/662; B60L 2240/665; B60L 2270/145; B60L 3/102; B60L 3/12; B60L 50/30; B60L 50/51; B60L 50/52; B60L 58/12; B60L 58/22; B60L 58/30; Y02T 10/64; Y02T 10/70; Y02T 10/72; Y02T 90/16; Y02T 90/40

See application file for complete search history.

(56) References Cited

U.S. PATENT DOCUMENTS

| | | | |
|---|---|---|---|
| 5,381,870 A | 1/1995 | Kaufman | |
| 5,893,425 A | 4/1999 | Finkle | |
| 6,050,357 A * | 4/2000 | Staelin | B60L 3/0092 |
| | | | 180/65.1 |
| 6,182,779 B1 | 2/2001 | Hosoda | |
| 6,292,713 B1 | 9/2001 | Jouppi et al. | |
| 6,428,050 B1 | 8/2002 | Brandley et al. | |
| 6,984,192 B2 | 1/2006 | Markyvech | |
| 7,123,285 B2 | 10/2006 | Smith et al. | |
| 7,204,330 B1 | 4/2007 | Lauren | |
| 7,593,546 B2 | 9/2009 | Jouppi | |
| 7,626,569 B2 | 12/2009 | Lanier | |
| 7,643,051 B2 | 1/2010 | Sandberg et al. | |
| 7,698,048 B2 | 4/2010 | Jung et al. | |
| 7,706,935 B2 | 4/2010 | Dube et al. | |
| 7,769,492 B2 | 8/2010 | Wang et al. | |
| 7,937,194 B2 | 5/2011 | Nasr et al. | |
| 7,957,837 B2 | 6/2011 | Ziegler et al. | |
| 7,962,256 B2 | 6/2011 | Stevens et al. | |
| 8,022,650 B2 * | 9/2011 | Itou | B60L 50/50 |
| | | | 318/432 |
| 8,082,073 B2 | 12/2011 | Okamura et al. | |
| 8,160,747 B1 | 4/2012 | Blackwell et al. | |
| 8,170,764 B2 | 5/2012 | Kaminsky et al. | |
| 8,209,051 B2 | 6/2012 | Wang et al. | |
| 8,239,146 B2 * | 8/2012 | Vock | G01P 3/50 |
| | | | 702/44 |
| 8,253,356 B2 | 8/2012 | Itoh et al. | |
| 8,265,793 B2 | 9/2012 | Cross et al. | |
| 8,306,664 B1 | 11/2012 | Wiley et al. | |
| 8,442,661 B1 | 5/2013 | Blackwell et al. | |
| 8,556,009 B2 | 10/2013 | Bartilson | |
| 8,596,390 B2 | 12/2013 | Soliman et al. | |
| 8,602,142 B2 | 12/2013 | Books et al. | |
| 8,612,084 B2 | 12/2013 | Hennessy et al. | |
| 10,398,962 B2 * | 9/2019 | Rautiainen | A63C 17/26 |
| 10,611,261 B2 * | 4/2020 | Pang | A63C 17/12 |
| 2006/0207839 A1 * | 9/2006 | Wilt | A63C 17/01 |
| | | | 188/1.12 |
| 2007/0296170 A1 * | 12/2007 | Field | A63C 17/01 |
| | | | 280/47.131 |
| 2008/0039990 A1 * | 2/2008 | Stevens | B62K 11/007 |
| | | | 701/22 |
| 2010/0222941 A1 * | 9/2010 | Chang | A63C 17/12 |
| | | | 701/2 |
| 2013/0081891 A1 * | 4/2013 | Ulmen | A63C 17/12 |
| | | | 180/181 |
| 2013/0192908 A1 * | 8/2013 | Schlagheck | B62K 5/003 |
| | | | 180/65.1 |
| 2013/0261914 A1 | 10/2013 | Ingram et al. | |
| 2014/0262575 A1 * | 9/2014 | Richter | A61G 5/1054 |
| | | | 180/167 |

* cited by examiner

LIGHT ELECTRIC VEHICLE THAT SUPPORTS THE WEIGHT OF A USER

CROSS-REFERENCE TO RELATED APPLICATIONS

This application claims the benefit under 35 U.S.C. 120 as a continuation of U.S. patent application Ser. No. 15/601,938, filed 22 May 2017, titled "DYNAMIC CONTROL FOR LIGHT ELECTRIC VEHICLES," which claims the benefit under 35 U.S.C. 120 as a continuation of U.S. patent application Ser. No. 15/189,213, filed 22 Jun. 2016, which is a continuation of U.S. patent application Ser. No. 14/994,506, filed 13 Jan. 2016, which is a continuation of U.S. patent application Ser. No. 14/212,606, filed 14 Mar. 2014, which claims the benefit of U.S. Provisional Application No. 61/785,543 filed 14 Mar. 2013, both of which are incorporated in their entirety by this reference.

TECHNICAL FIELD

This invention relates generally to the electric vehicle field, and more specifically to a new and useful system and method for dynamic vehicle control in the electric vehicle field.

BACKGROUND

Light electric vehicles can be desirable for their portability and flexibility of use. However, due to the nascency of the field, many users lack the experience to properly handle the full capabilities of the vehicle. Unfortunately, conventional vehicles do not offer options that limit the vehicle performance based on the driving expertise of the user.

Additionally, the electric motor propelling the vehicle enables a wide range of vehicle performance capabilities. Completely different vehicle response profiles can be achieved through different motor control schemes, wherein the motor can be controlled to respond to the same input signal in a completely different manner. While it can be desirable for a user to control which vehicle response profile is applied to each driving session, conventional vehicles do not offer the option of selecting significantly different vehicle response profiles to the user.

Thus, there is a need in the electric vehicle field to create a new and useful motor control scheme that adjusts the vehicle response profile based on user data.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
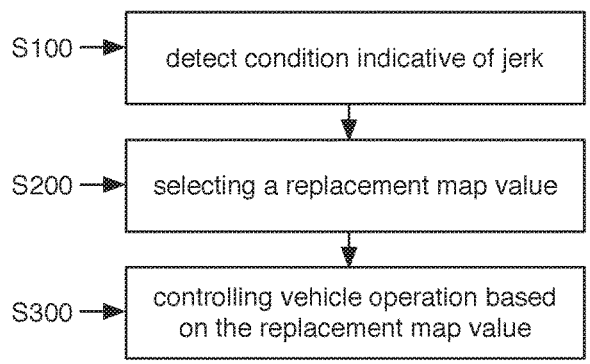
FIG. 1 is a schematic representation of the method.

As shown in FIG. 1, the method for dynamic vehicle control can include detecting a condition indicative of perturbation S100, selecting a replacement map value S200, and controlling vehicle operation based on the replacement output value S300. The method functions to accommodate for vehicle perturbation during vehicle operation. In particular, this method functions to accommodate for perturbation during light vehicle operation. Vehicle perturbation can be particularly apparent in light vehicles, and can substantially affect the ride of the user because the user carries a substantial amount of the overall system momentum. For example, a user can be pitched off the vehicle when the vehicle perturbations. These effects are magnified when the vehicle has a high power to weight ratio, because the vehicle can propel the system at relatively high speeds. These effects are further magnified if the vehicle is powered by an electric motor, since electric motors can near-instantaneously change the power and/or torque applied to the driven wheels, enabling the vehicle to change acceleration quickly.

1. System

Figure 2:
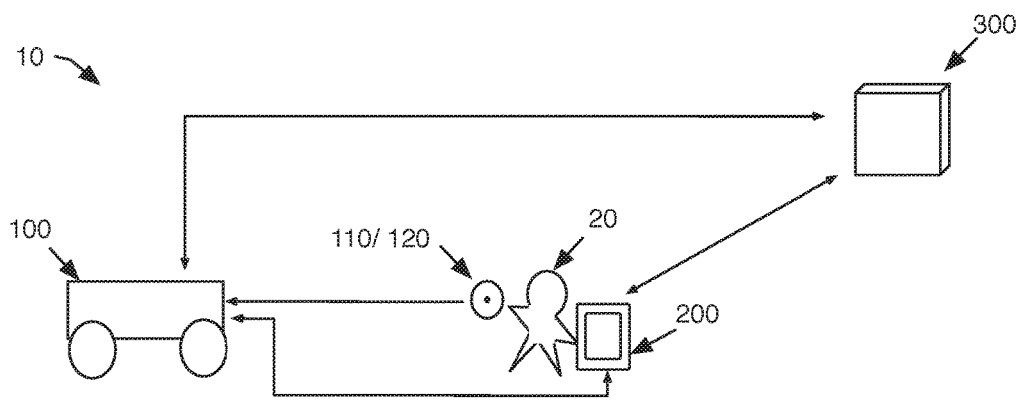
FIG. 2 is a schematic representation of the system.

As shown in FIG. 2, the method is preferably utilized with, and more preferably performed by, a vehicle 100. The method can additionally or alternatively be used with and/or performed by a mobile device 200, a remote server 300, or any other suitable component.

The vehicle 100 of the system functions to support and propel a user 20. The vehicle 100 preferably has a high power to weight ratio, but can alternatively have a high torque to weight ratio, or any other suitable indicator of a high-powered, lightweight vehicle 100. The vehicle 100 preferably has a power to weight ratio of over 200 W/kg, more preferably a power to weight ratio over 290 W/kg, such as a power to weight ratio of 360 W/kg, 400 W/kg, or above, but can alternatively have a power to weight ratio of over 100 W/kg, under 100 W/kg, or have any other suitable power to weight ratio. The vehicle 100 is preferably a light vehicle 100, wherein the vehicle weight is preferably a fraction of the weight of the rider(s) (e.g., the total weight of the riders or the weight of a single rider), but can alternatively be more than or equal to the weight of the rider. The total unloaded vehicle weight is preferably less than 7 kg, but can alternatively be less than 100 kg, more than 100 kg, less than 80 kg, 70 kg, 60 kg, 50 kg, 30 kg, 20 kg, or 10 kg, or have any other suitable weight. The vehicle 100 preferably has a relatively high power rating. The vehicle power is preferably apparent power, but can alternatively be actual or reactive power. The vehicle 100 motor preferably has a motor power of 2000 W or higher, such as a motor power of 3000 W or 10,000 W, but can alternatively have a motor power of 1000 W or higher, 1000 W or lower, or have any other suitable motor power.

The vehicle 100 is preferably controlled based on a throttle map, but can alternatively be controlled based on a torque map (correlating speed or throttle position 122 to the torque output), a power map, a speed map, an acceleration map, or any other suitable map 400. The map 400 preferably correlates input values 410 with output values 420. The input value 410 and/or the output value 420 can be a function of one or more variables (e.g., vehicle operation parameters, ambient environment parameters, etc.), wherein the variables can be functions themselves, derivatives, or any other suitable variable. The map can be multidimensional, with multiple input values and/or multiple output values. For example, the throttle map preferably correlates a throttle value with an output value, wherein the throttle value and output value are both map values. The throttle value is preferably received from the throttle. The output value is preferably a motor parameter value, such as a power output value, a current output value, a voltage output value, or a torque output value. Alternatively, the output value can be a vehicle parameter value, such as a vehicle speed, a vehicle acceleration, an angular wheel speed, or angular wheel acceleration. However, the output value can be any other suitable measure of vehicle 100, motor, or energy storage unit output. The throttle map is preferably a default throttle map, wherein the default throttle map is adjusted (permanently or temporarily), or forms the basis for the map value adjustment to accommodate for vehicle perturbation. The default throttle map is preferably selected or generated for a user 20 based on one or more user parameters. Alternatively, the default throttle map can be a predetermined, standard map. The throttle map is preferably stored by the vehicle 100, but can alternatively be stored by the mobile device 200 or any other suitable system component. The throttle map preferably linearly correlates the throttle values with the output values (e.g., linearly increasing), but the relationship between the throttle and output values can alternatively be curved (e.g., logarithmically increasing, hysteretic, logarithmically decreasing, etc.). The vehicle 100 is preferably current controlled (e.g., has a current controlled user response, be controlled based on current estimation, be controlled based on current saturation, etc.), but can alternatively be voltage controlled or otherwise controlled.

Map value change (e.g., output value change) or traversal along the throttle map or curve is preferably limited by a map value change rate limit 402 (e.g., output value change rate limit), wherein the rate of operational or apparent map value change is preferably controlled to not exceed the map value change rate limit 402. For example, the torque output can be limited to 5 Nm/s, wherein the torque output cannot change faster than 5 Nm. Alternatively, the rate at which the target map value is changed can be controlled to fall below the map value change rate limit 402. For example, the torque value mapped to a first throttle value is prevented from changing faster than 5 Nm/s. The map value change rate can additionally include a minimum output change rate limit. The map value change rate limit(s) 402 are preferably selected based on user parameters, but can alternatively be a default standard limit, selected based on substantially instantaneous vehicle parameters, selected based on historical vehicle operation parameters, be predetermined, or be selected, calculated, or otherwise determined in any other suitable manner. For example, an output change rate limit can increase with increased experience or user weight, and decrease with lower experience or user weight. In another example, the output change rate limit can increase with higher velocity or acceleration, and decrease with lower velocity or acceleration.

In one variation of the vehicle 100 in which the vehicle 100 is current controlled, the throttle map associates throttle values with target transconductance values, wherein the vehicle 100 is controlled to maintain the transconductance (e.g., ratio of input voltage to output current) by increasing or decreasing the voltage supplied. In another variation of the vehicle 100 wherein the vehicle 100 is voltage controlled, the throttle map associates throttle values with ratios of input voltage to output voltage, wherein the vehicle 100 is controlled to maintain the ratio by increasing or decreasing the current supplied. However, the vehicle 100 can be otherwise controlled. The processor preferably controls vehicle operation, but the vehicle 100 can alternatively be controlled by the mobile device 200 or any other suitable system component.

The vehicle 100 preferably includes a support surface, an energy storage unit (e.g., battery), a processor, a drive mechanism, one or more wheels, a throttle, and a drive controller 110. The vehicle 100 can additionally include a handle or steering column. The vehicle 100 can additionally include one or more receivers, transmitters (paired or unpaired with a receiver), sensors, or any other suitable component. Examples of the vehicle 100 include an electric skateboard, an electric scooter, an electric wheelchair, and an electric bicycle. The vehicle 100 can be the vehicle disclosed in U.S. patent application Ser. No. 13/645,388, filed 4 Oct. 2012, incorporated herein in its entirety by this reference. However, the vehicle 100 can have any other suitable form factor or be any other suitable vehicle.

The support surface functions to support the user 20. The support surface is preferably a standing surface, and preferably includes a broad support face distal from the wheel axis of rotation. Alternatively, the support surface can be a seat, deck (e.g., skateboard deck), pegs, or any other suitable surface capable of supporting the user 20 on the vehicle 100.

The energy storage unit functions to store power and provide power to the drive mechanism. The energy storage unit is preferably a battery, more preferably a rechargeable battery (e.g., a secondary battery) but can alternatively be a non-rechargeable battery, a fuel cell with fuel storage (e.g., metal hydride, hydrogen gas, methane storage, etc.), a thermal storage mechanism, a flywheel, or any other suitable energy storage mechanism. The battery preferably includes a plurality of battery cells, wherein the battery cells are preferably connected in parallel, but can alternatively be connected in series of a combination thereof. The battery cells are preferably lithium chemistry (e.g., lithium ion, lithium polymer, etc.), but can alternatively be nickel cadmium or any other suitable chemistry. The energy storage unit can additionally include battery balancing circuits or any other suitable battery management circuitry.

The processor functions to control vehicle operation. The processor preferably controls vehicle operation by controlling power provision to the electric motor, but can otherwise control vehicle operation. In one variation of the vehicle 100, the processor controls the current provided to the electric motor to maintain an output voltage. In another variation of the vehicle 100, the processor controls the voltage provided to the electric motor to maintain an output current. The processor preferably controls vehicle operation based on a throttle map for the vehicle 100, a throttle value received from the throttle, and a drive command 111 received from the drive controller 110. However, the processor can alternatively control vehicle operation based on any other suitable control instruction and input. The processor can additionally record and process sensor measurements, wherein vehicle control can additionally be based on sensor measurements. The processor can additionally receive and process data received by the receiver from the mobile device 200, wherein vehicle control can additionally be based on data received from the mobile device 200. The processor can additionally or alternatively perform any other suitable vehicle operation functionality. The vehicle 100 can include one or more processors.

The drive mechanism functions to propel the vehicle 100 and any load supported by the vehicle 100. The drive mechanism is preferably a motor, more preferably an electric motor, but alternatively any other suitable motor. The vehicle 100 preferably includes at least one motor, more preferably at least two motors, but can alternatively include any suitable number of motors. In one variation of the vehicle 100, the vehicle 100 includes one motor for each wheel. In another variation of the vehicle 100, the vehicle 100 includes one motor for each pair of wheels. The motor is preferably connected to a wheel by a drivetrain, but can alternatively be otherwise connected. The motor is preferably an A/C motor, such as an induction motor, a cage and wound rotor induction motor, or any other suitable A/C motor, but can alternatively be an A/C-D/C motor, a D/C motor, or any other suitable motor. The vehicle 100 can additionally include a motor controller that functions to control the motor. The vehicle 100 can include one motor controller for each motor, or can include a motor controller that controls multiple motors. The vehicle 100 can additionally include a wheel or motor encoder that functions to measure one or more angular position parameters of the motor or driven wheel. For example, the encoder can measure the angular position, angular velocity, and/or angular acceleration of the motor or wheel. Each driven wheel preferably includes an encoder. Alternatively, each motor can include an encoder. Alternatively, every wheel, driven or passive, can include an encoder. However, the encoders can be otherwise distributed across the system.

The wheels of the vehicle 100 function to translate relative to the drive surface to translate the vehicle 100 and the load (e.g., user 20) along the drive surface. The vehicle 100 preferably includes four wheels, but can alternatively include two wheels or any suitable number of wheels. The wheels are preferably substantially identical (e.g., with the same diameter), but can alternatively be different. The wheels are preferably coaxially paired, but can alternatively be arranged with the axes of rotation in parallel. The four wheels are preferably arranged at the corners of a rectilinear matrix, but can alternatively be arranged in a trapezoidal configuration or any other suitable configuration. At least one wheel of the vehicle 100 is driven. The four wheels are preferably all driven (e.g., all drivably connected to a motor, more preferably each connected to an independent motor), but a subset of the wheels can alternatively be driven and/or passive. In one example, the rear wheels (e.g., a pair of wheels that are coaxially arranged and distal the steering column) are driven (e.g., drivably connected to the motor). In another example, one wheel of each pair of coaxially arranged wheels is driven. However, the vehicle 100 can have any other suitable configuration of driven and passive wheels.

The throttle 120 (user input, user motor input, user power control, user input mechanism) of the vehicle 100 functions as an input to determine the vehicle output. The throttle is preferably controlled by the user 20, but can alternatively be controlled by the mobile device 200 of the user 20 or be otherwise controlled. The throttle preferably communicates a throttle value (user input value, motor input value, power input value) to the vehicle 100, more preferably to the processor but alternatively to the motor controller. The throttle value is preferably used to determine an output value based on a throttle map (user input map, motor input map, power input map, etc.), wherein the vehicle 100 is subsequently controlled to meet the output value. The throttle preferably has a default throttle position 121, which preferably maps to a default throttle value. For example, the default throttle value can be zero. However, the default throttle value can be any other suitable value. The throttle preferably automatically returns to the default throttle position 121 when the throttle is released. The throttle value is preferably dependent upon the amount of throttle position deviation away from the default throttle position 121. The throttle can be a mechanical throttle or a digital throttle. In one variation of a mechanical throttle, movement of the throttle away from the default throttle position 121 adjusts the position of a variable resistor (e.g., potentiometer), wherein the throttle value is determined from the resultant resistivity. In one variation of a digital throttle, the throttle position or the amount of throttle deviation away from the default position is translated into a throttle value, which is then digitally communicated to the vehicle 100 (e.g., via a wire or through a wireless transmitter, such as a radio). The throttle position can be determined based on contact of one of a series of electrical contacts, the amount and/or location of a disturbance in a magnetic field, the return force of a spring, or determined in any other suitable manner. The throttle can be mounted to the vehicle 100 or be separate (e.g., removable) from the vehicle 100. The throttle is preferably a rotational member, wherein the throttle value is dependent upon an angular displacement relative to the default throttle position 121 (e.g., a wheel on a control mechanism, a roller on a handlebar, a pedal, etc.), but can alternatively be a trigger, wherein the throttle value is dependent upon a linear displacement relative to the default throttle position 121, or have any other suitable form factor.

The drive controller 110 of the vehicle 100 functions to send a drive command 111 to the vehicle 100, wherein the vehicle 100 drives in response to receipt of a combination of the drive command 111 and a throttle value selection 123. The drive controller 110 is preferably operable between a first and a second mode, wherein the drive controller 110 sends a drive command 111 in the first mode and does not send a drive command 111 in the second mode. In one variation of the vehicle 100, the drive controller 110 is operable between a closed circuit in the first mode, and an open circuit in the second mode. Alternatively, the drive controller 110 can be operable between a plurality of different modes, wherein the drive controller 110 can send multiple signals. The drive controller 110 can be mechanical, wherein the drive command 111 can be a physical connection between the drive mechanism and the wheel. An example of a mechanical drive controller 110 is a clutch. The drive controller 110 can be digital, wherein a digital command is sent to the vehicle 100 (e.g., through a wired connection or a wireless connection). The vehicle 100 is preferably operated (e.g., power supplied to the motor) as long as a drive command 111 is received. However, the vehicle 100 can be operated without continuous receipt of the drive command 111. For example, the vehicle 100 be placed in the drive mode in response to receipt of the drive command 111 and operated in the drive mode until a standby command is received, wherein the vehicle 100 is placed in the standby mode. However, the vehicle 100 can be otherwise operated. The drive controller 110 is preferably a trigger, but can alternatively be a button, a roller, or have any other suitable form factor.

The handle or steering column functions to control the direction of vehicle translation. The handle or steering column can additionally function to support the user 20. The handle or steering column preferably controls planar rotation of a wheel, more preferably a pair of coaxially aligned wheels. The handle or steering column is preferably mounted to the vehicle 100, but can alternatively be removable.

The receiver of the vehicle 100 functions to receive signals for vehicle operation. The vehicle 100 preferably includes one or more receivers. A receiver preferably connects with and receives signals from the trigger and/or drive controller 110. A receiver (preferably a different receiver, alternatively the same receiver) can connect with and receive data from the mobile device 200 of the user 20, a remote server 300, or any other suitable data source. The transmitter of the vehicle 100 functions to transmit signals representative of vehicle operation. The vehicle 100 preferably includes one or more transmitters. The transmitter can connect with and communicate data to the mobile device 200 of the user 20, a remote server 300, or any other suitable component. The transmitter is preferably paired with the receiver, but can alternatively be a different transmitter. The transmitter and/or receiver preferably enable wireless communication, but can alternatively be wired. The communication technology of the transmitter and/or receiver is preferably a short-range communication technology, such as Bluetooth (e.g., Bluetooth 2.0), NFC, infrared, inductance, or low-power radio, but can alternatively be a long-range communication technology, such as WiFi, cellular, radio, sonic, cellular, or any other suitable communication technology. The vehicle 100 can include any suitable number of any suitable combination of the technologies.

The sensor of the vehicle 100 functions to measure a vehicle parameter. The vehicle parameter is preferably a vehicle position parameter (e.g., lateral or angular vehicle parameters), such as the vehicle position (e.g., location, altitude), vehicle acceleration, vehicle velocity, wheel position, angular wheel velocity, angular wheel acceleration, or wheel perturbation, but can alternatively be a vehicle 100 orientation parameter, such as the pitch, yaw, roll, heave, sway, or surge of the vehicle 100, or be any other suitable vehicle parameter. The vehicle parameters are preferably measured as vectors, but can alternatively be measured as scalars. The sensor can be an encoder, an accelerometer, a gyroscope, a weight sensor, a current sensor, a voltage sensor, a resistivity sensor, an altimeter, a GPS or other location unit, or any other suitable sensor. The sensor is preferably powered by the energy storage unit, but can be otherwise powered. The sensor preferably sends the measurements to the processor, but can alternatively send the measurements to the mobile device 200, the remote server 300, or any other suitable component of the system. The vehicle 100 can include any suitable number of any suitable combination of sensors.

The mobile device 200 of the system functions to represent the user 20. The mobile device 200 can function to uniquely identify the user 20, such as by transmitting a unique user 20 identifier stored by the mobile device 200 to the vehicle 100 or to a remote server 300, or otherwise uniquely identifying the user 20. The mobile device 200 can function to measure and communicate user parameters and/or vehicle parameters (e.g., apparent vehicle parameters) to the vehicle 100 or the remote server 300. The mobile device 200 can function to retrieve information from the remote server 300, process the information, and send the processed information and/or resultant instructions to the vehicle 100. The mobile device 200 is preferably retained at the same position relative to the user 20, more preferably the user torso, while the user 20 is riding the vehicle 100 (e.g., after user 20 mounts the vehicle 100 until user 20 gets off the vehicle 100 or stops the vehicle 100), but can alternatively vary in position relative to the user 20. For example, the mobile device 200 can be retained in a user 20 pocket or backpack during vehicle operation. Alternatively, the mobile device 200 can be retained by the vehicle 100 (e.g., transiently mounted to the vehicle 100).

The mobile device 200 is preferably a portable computing device, such as a smartphone, tablet, smartwatch, wearables (e.g., clip, pin, pendant, etc. including at least a processor), or any other suitable mobile device 200. The mobile device 200 preferably includes a communication system including a transmitter and/or receiver. The communication system can include one or more short-range communications, such as Bluetooth, NFC, inductive, or infrared, and/or long-range communications, such as cellular or radio. The mobile device 200 preferably includes one or more sensors. The sensors can include a location sensor, such as a GPS system, triangulation system, or any other suitable location unit. The sensors can include orientation sensors, such as an accelerometer, gyroscope, altimeter, or any other suitable orientation sensor. The sensors can include ambient environment sensors, such as light sensors, acoustic sensors (e.g., microphones), or any other suitable ambient environment sensors. However, the mobile device 200 can include any other suitable sensor.

The system 10 can additionally include one or more remote server systems (processing systems). The remote server 300 can function to store user parameters, such as user characteristics, riding history, and preferences. The remote server 300 can additionally or alternatively function to retrieve information from third party sites, such as social networking systems, and can also process the information to extract user parameters. The remote server 300 is preferably remote from the vehicle 100, more preferably remote from the mobile device 200, and can communicate with the vehicle 100 and/or device through a wired or wireless communication. The remote server 300 can be part of a social networking system, a monitoring system, a database, or any other suitable remote server system.

A user parameter is preferably used by the system to determine the replacement output value. The user parameter can additionally or alternatively be used by the system to determine the default map, the output value change rate limit, or any other suitable parameter indicative of user 20 riding experience. The user parameter can additionally or alternatively be used to generate control instructions. The user parameter is preferably determined by the mobile device 200, but can alternatively be determined by the vehicle 100, the remote server 300, or any other suitable component. The user parameter is preferably sent to and received by the vehicle 100. The user parameter can be sent through the mobile device 200 when determined by the remote server 300. The user parameter can be determined from sensor measurements, historical vehicle use by the user 20, social networking system content, schedules, or any other suitable data source. The user parameter can be determined (e.g., retrieved, calculated, selected, etc.) and/or sent at a predetermined frequency, in response to a request received from the vehicle 100 or mobile device 200, in response to detection of a sending event (e.g., in response to detection of a perturbation event) by the mobile device 200, or determined and/or sent at any suitable frequency. For example, the user parameter can be requested by the vehicle 100 when a rapid change in a vehicle position parameter (velocity or acceleration) is detected. In another example, the user parameter can be requested when the velocity, acceleration, or perturbation meets or exceeds a predetermined value (e.g., when the vehicle velocity is zero). Parameters other than user parameters can be sent in response to the request, such as throttle maps.

The user parameter is preferably descriptive of the user 20. The user parameters can include user preferences, riding experience, physical characteristics, whether the mobile device 200 has been substantially statically coupled to the user 20 or vehicle 100 (e.g., within a threshold range of motion), user emotion, user fatigue or energy level, or any other suitable parameter descriptive of the user 20. Examples of user preferences include the output value upper and lower limits, the output change rate limit (e.g., upper and/or lower), the slope or curve of the correlation, automatic driving settings, and preferred operation modes. However, the user parameters can include any other suitable user preferences. The riding experience is preferably represented by a number, but can alternatively be otherwise represented. The riding experience can be or be calculated from the throttle history for the user 20 (e.g., throttle position or throttle value), the location history, the ride duration of each ride, the historic vehicle 100 performance, social network validation, or any other suitable factor indicative of riding experience. Examples of physical characteristics can include height, weight, energy level, BMI, clothing, or any other suitable physical user characteristic. The user parameters can alternatively or additionally be descriptive of the system. The user parameters can include the user angular orientation on the vehicle 100, user longitudinal or lateral position on the vehicle 100, whether the user 20 is on or off the vehicle 100, user weight distribution across the support surface, the user velocity, the user acceleration, the system location, the system velocity, system acceleration, system angular position (e.g., pitch, such as incline or decline, yaw, roll), ambient environment parameters (e.g., the terrain, light, noise), the starting location of the system, the user 20 destination, or any other suitable system parameter. However, user parameters can include any other suitable measurement or information indicative of riding context, or any other suitable user parameter.

Figure 3:
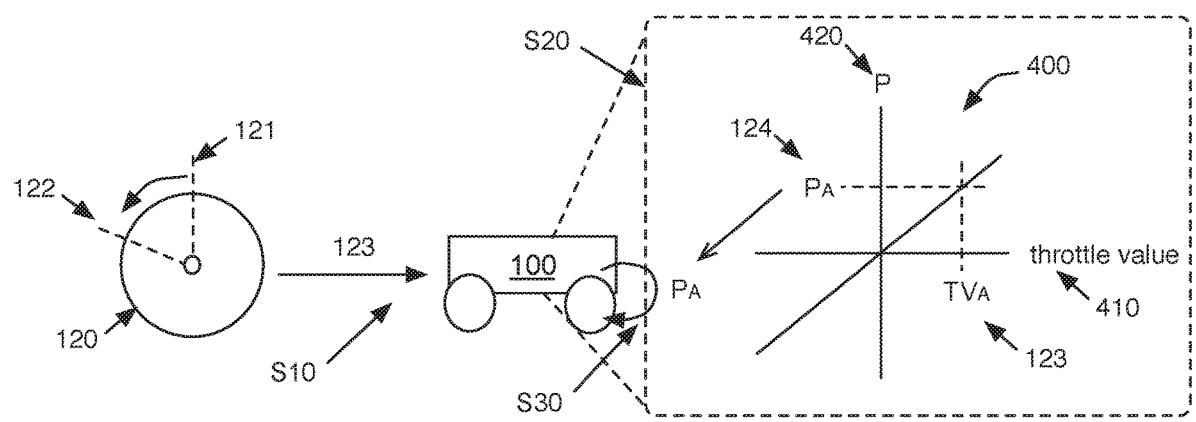
FIG. 3 is a schematic representation of normal vehicle operation.

In typical vehicle operation, an example of which is shown in FIG. 3, the vehicle 100 determines the input value S10, determines the output value 124 (system control value) for the input value 123 based on the map S20, and controls vehicle operation to meet the output value S30. Determining the input value preferably includes determining the throttle value, but can alternatively include determining any other suitable input. Determining the throttle value can include receiving the throttle value from a throttle or throttle controller, or can include determining a throttle value based on the throttle position. Determining the output value for the input value based on the map preferably includes determining an output value for the throttle value based on a throttle map, but can alternatively include determining an output value for any other suitable input value based on any other suitable map. The map is preferably a default map used for typical driving conditions (e.g., non-perturbation conditions), but can alternatively be a map used under any other suitable driving condition. The map is preferably selected based on user parameters, such as vehicle velocity, user experience, or driving history, but can alternatively be a predetermined default map. Controlling vehicle operation to meet the output value preferably includes adjusting the energy storage unit output parameters (e.g., current output, voltage output, power output, etc.), motor input parameters (e.g., current input, voltage input, power input, etc.), and/or motor output parameters (e.g., torque output, motor speed, etc.) to meet the output value. The vehicle operation is preferably controlled to maintain the actual output value within a predetermined range of the target output value, as determined from the map, but can alternatively be controlled to meet the target output value (e.g., exactly meet the output value), or be otherwise controlled based on the output value determined from the map. In one variation of the method of typical vehicle operation, the method includes receiving a drive command 111 from the drive controller 110, receiving a trigger value beyond a predetermined range of the default throttle value, determining an output value corresponding to the throttle value based on the throttle map, and controlling the vehicle output to substantially meet the target output value, within a predetermined error threshold. However, the vehicle 100 can be otherwise controlled.

2. Method of Dynamic Vehicle Control

As shown in FIG. 1, the method for dynamic vehicle control or dynamic perturbation mitigation, includes detecting a condition indicative of perturbation S100, selecting a replacement map value S200, and controlling vehicle operation based on the replacement output value S300.

Detecting a condition indicative of perturbation S100 functions to detect that a perturbation has happened, or that perturbation is about to occur. Perturbation preferably includes jerk, more preferably jerk above a jerk threshold, but can additionally or alternatively include any other suitable measure of sudden change (e.g., change beyond a predetermined threshold) in position, velocity, or acceleration of the vehicle or user. The perturbation can be externally applied (e.g., due to the vehicle hitting an obstacle and suddenly stopping, etc.), applied by the vehicle (e.g., due to sudden deceleration or acceleration, etc.), applied by the user (e.g., due to sudden changes in user control, user mounting or dismounting the vehicle, etc.), or generated an applied in any other suitable manner. Jerk is preferably a rate of change of acceleration (e.g., derivative of acceleration), but can alternatively be any other suitable perturbation. The condition indicative of perturbation preferably determines or detects instant or future perturbation above a perturbation threshold. The perturbation threshold is preferably a threshold acceleration change rate (jerk threshold), but can alternatively be a threshold of any other suitable perturbation measure. The perturbation threshold is preferably determined based on the user parameters, but can alternatively be predetermined (e.g., set). In one variation, the perturbation threshold (jerk threshold) is preferably 1 m/s$^3$, but can alternatively be higher or lower. Detecting a condition indicative of perturbation can include detecting a condition indicative of future perturbation and/or detecting a condition indicative of instantaneous perturbation. In response to detection of the condition indicative of perturbation, the vehicle preferably takes action to mitigate the perturbation and/or the effects of the perturbation (e.g., prevent the user from falling off the vehicle). Perturbation detection can additionally or alternatively be used to mitigate perturbation due to the vehicle attempting to immediately meet a high output value mapped to a high input value. The perturbation measurement is preferably an absolute value (e.g., scalar) but can alternatively be a vector.

Detecting a condition indicative of future perturbation S110 can include detecting a vehicle velocity equivalent to or below a threshold velocity and detecting a throttle value above a threshold throttle value, determining a throttle value beyond a threshold deviation from the previous throttle value, or determining that the output value mapped to the instantaneous throttle value is above a threshold value. For example, a condition indicative of future perturbation can be detected when the vehicle velocity is zero, the previous throttle value was zero (e.g., default), and the instantaneous throttle value is the maximum throttle value.

Detecting a condition indicative of future perturbation can additionally or alternatively include determining an instantaneous vehicle acceleration, determining the anticipated vehicle acceleration based on the instantaneous output value (e.g., as determined from the map based on the throttle value), and comparing the instantaneous vehicle acceleration with the anticipated vehicle acceleration. A condition indicative of perturbation can be detected when the difference between the instantaneous vehicle acceleration with the anticipated vehicle acceleration exceeds a predetermined acceleration difference threshold.

Detecting a condition indicative of instantaneous perturbation S120 can include detecting perturbation at the vehicle or at the mobile device. The perturbation is more preferably determined by the vehicle or by the mobile device, but can alternatively be determined by any other suitable component. For example, a perturbation can be detected when the vehicle hits an obstacle, starts driving, or slows down.

Detecting a condition indicative of perturbation at the vehicle can include detecting a change in vehicle acceleration (e.g., speeding up or slowing down) beyond a threshold perturbation (e.g., faster than 1 m/s$^3$). The perturbation can additionally or alternatively be detected at the vehicle as a change in wheel angular acceleration beyond a threshold perturbation, a shift in a center of gravity of the user or the system beyond a threshold perturbation, change in input value (e.g., throttle value) beyond an input value change rate limit (e.g., throttle value change rate limit), change in output value beyond an output change rate limit, or detected in any other suitable manner.

Detecting a condition indicative of perturbation at the mobile device can include detecting a sudden change in acceleration beyond a threshold perturbation, wherein the mobile device continuously or at a predetermined frequency measures the mobile device acceleration. The mobile device acceleration is preferably indicative of user acceleration, and is preferably additionally indicative of system acceleration during steady state (e.g., non-perturbed) operation. Detection of mobile device acceleration beyond the threshold perturbation can be indicative of user perturbation (e.g., a user falling off the vehicle) or of system perturbation. The mobile device can send the perturbation measurement to the vehicle. The mobile device can additionally or alternatively generate a perturbation notification, which is sent to and subsequently received by the vehicle S121. The perturbation notification can include the perturbation measurement, mitigation instructions (e.g., vehicle operation instructions), or any other suitable information.

Detecting a condition indicative of perturbation at the mobile device can additionally or alternatively include measuring the substantially instantaneous mobile device acceleration, sending the measured mobile device acceleration to the vehicle, and, at the vehicle, comparing the mobile device acceleration with the instantaneous vehicle acceleration or the estimated vehicle acceleration based on the wheel angular acceleration. A perturbation condition is detected when the difference between the mobile device acceleration and the vehicle acceleration (measured or estimated) exceeds a threshold difference. However, the perturbation condition can be otherwise detected.

Figure 5:
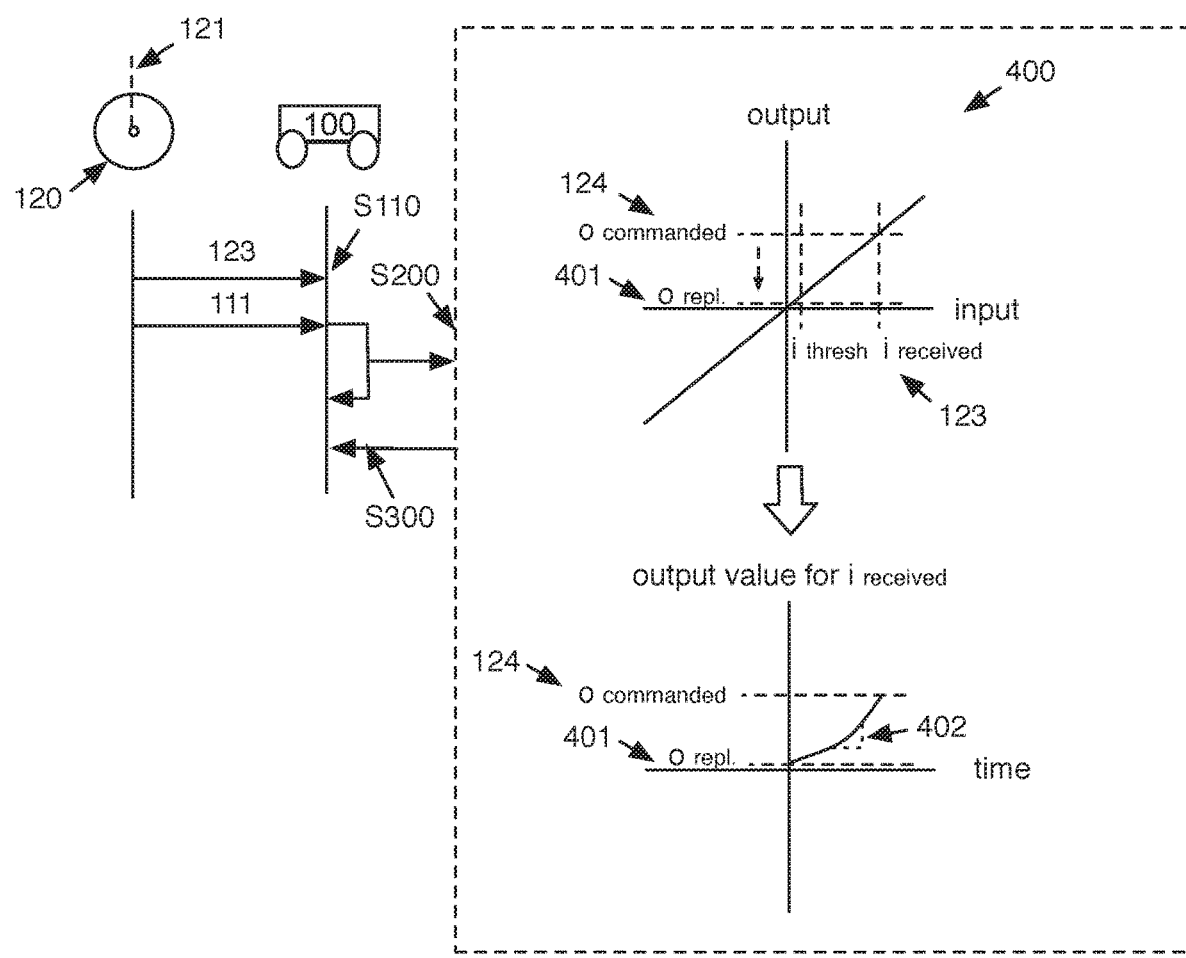
FIG. 5 is a schematic representation of a second example of the method including future perturbation detection.

In one example, detecting a condition indicative of perturbation can include determining that a vehicle position parameter is below or equal to a threshold value (e.g., wherein the threshold value is 0 m/s$^2$), receiving a first throttle value from the throttle, wherein the first throttle value is beyond a predetermined range relative to the default throttle value (e.g., near the maximum throttle value), and receiving a drive command after receipt of the throttle value, as shown in FIG. 5.

Figure 6:
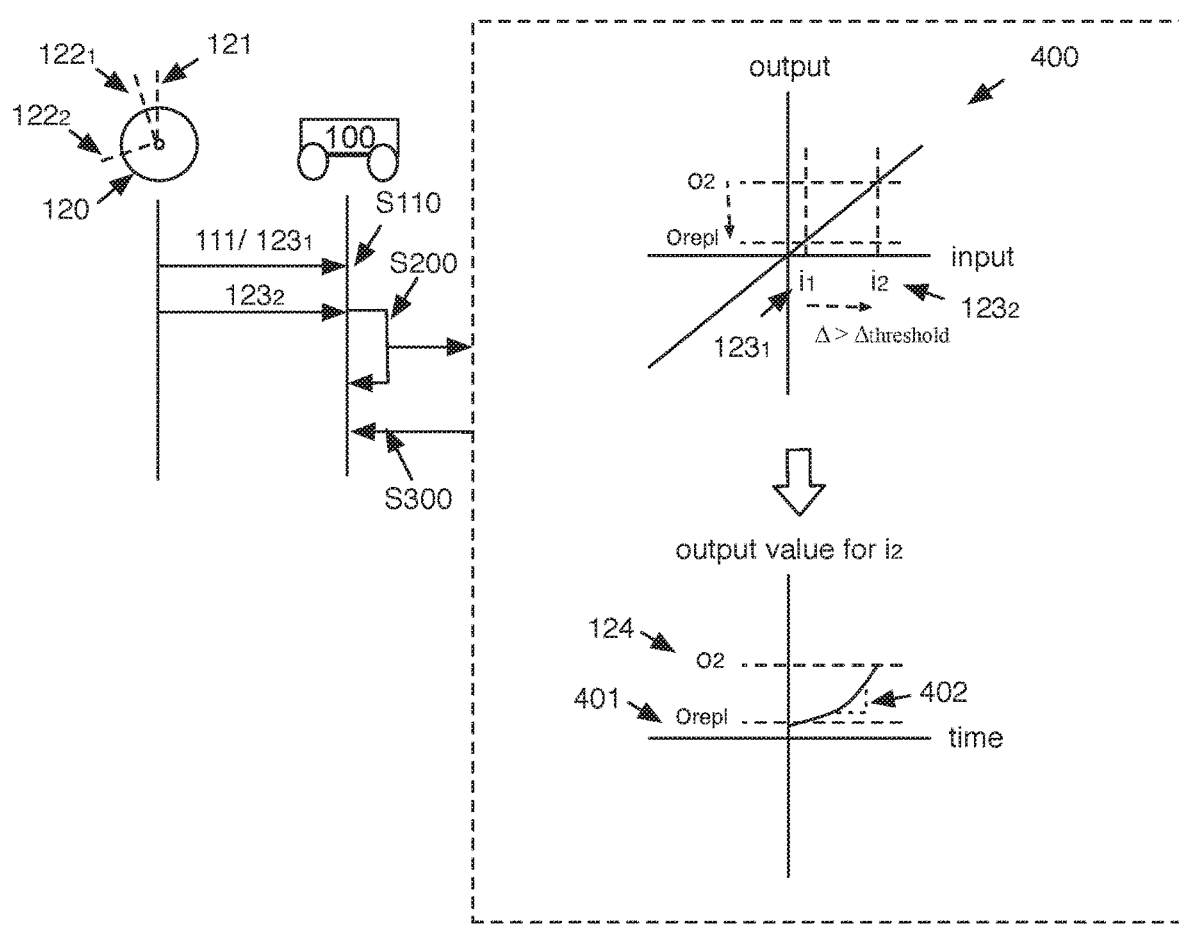
FIG. 6 is a schematic representation of a third example of the method including substantially instantaneous perturbation detection due to a sudden throttle value change.

In another example, detecting a condition indicative of perturbation can include determining that a vehicle position parameter is below or equal to a threshold value (e.g., wherein the threshold value is 0 m/s$^2$), receiving a drive command, and receiving the first throttle value after receipt of the drive command, wherein the first throttle value is beyond a predetermined range relative to the prior throttle value, as shown in FIG. 6.

In another example, detecting a condition indicative of perturbation can include determining a vehicle acceleration above a threshold acceleration and detecting a loss of a drive command or detecting a drop in the throttle value beyond a threshold change. In this example, perturbation can be detected when a connection between the drive controller and/or throttle is lost. Detecting a condition indicative of perturbation can additionally include detecting a vehicle pitch exceeding a first angular range defined relative to a gravity vector (e.g., indicative that the vehicle is driving up an incline) from mobile device or vehicle orientation sensors, wherein the replacement output value can be subsequently set to the output value prior to connection loss (e.g., to prevent sudden slowing while driving up the incline). The replacement output value can be gradually decreased to the default output value (e.g., mapped to the default input value) such that vehicle traversal is halted. Detecting a condition indicative of perturbation can additionally include detecting a vehicle pitch exceeding a second angular range defined relative to a gravity vector (e.g., indicative that the vehicle is driving down a decline) from mobile device or vehicle orientation sensors, wherein the replacement output value can be subsequently set to the output value prior to connection loss (e.g., to prevent sudden slowing while driving up the incline). The replacement output value can be gradually decreased to the default output value (e.g., mapped to the default input value) such that vehicle traversal is halted. However, vehicle or user perturbation can be otherwise detected by the mobile device, vehicle, or any other suitable component of the system.

Selecting a replacement map value S200 functions to determine a system control value that results in a mitigating response to reduce the effects of vehicle perturbation. The mitigating response preferably reduces the effects of vehicle perturbation on the load, such as the user (e.g., prevents the user from falling off the vehicle) but can alternatively reduce the effect of vehicle perturbation on the vehicle or on any other suitable system component. The replacement map value 401 preferably functions as a target value, wherein the vehicle is gradually controlled to meet the replacement map value from the default map value. The replacement map value can alternatively function as an immediate replacement for the input or output value, wherein the vehicle is substantially instantaneously controlled to meet the replacement map value, and is gradually controlled to regain the default map value. The replacement map value is preferably a set of values that temporarily or permanently replace the corresponding map values on the default map (e.g., deform the default map), but can alternatively be a new map (e.g., mapping the same input and output variables or mapping different input or output variables), be an upper or lower limit on a map variable (e.g., an upper or lower output limit), a new curve profile (e.g., new slope), a selection of whether or not a map should be used, or be any other suitable selection of a variable effecting vehicle performance or response.

The replacement map value is preferably determined (e.g., selected, calculated, etc.) in response to detection of the condition indicative of perturbation, but can alternatively be predetermined and mapped to a given perturbation measurement or perturbation condition, or otherwise determined. The replacement map value is preferably a replacement output value (e.g., for a given input value), but can alternatively be a replacement input value (e.g., for a given output value). A single replacement map value can be selected. More preferably, a set of replacement map values, each corresponding to a complementary input or output value, is selected. For example, a replacement output value can be selected for an instantaneous throttle value. In another example, a set of replacement output values can be selected for a range of throttle values centered about an instantaneous throttle value. A replacement map value can be independently selected for each driven wheel. Alternatively, a replacement map value can be selected for all driven wheels, selected for a pair of driven coaxial wheels, or selected for any other suitable combination of wheels.

The replacement map value can be determined based on a user parameter, determined based on an instantaneous vehicle parameter, determined based on an historical vehicle parameter, determined based on historical map values, determined based on default map values, and/or be determined based any other suitable variable. The replacement map value is preferably calculated from an equation including the vehicle parameter, user parameter, and/or map values as variables. The equation can additionally include the vehicle operation parameters or perturbation measurement as variables. Alternatively the replacement map values can be determined from a chart, graph, any other suitable data structure, or determined in any other suitable manner. The replacement map value is preferably determined by the vehicle, more preferably determined by the vehicle based on user parameters received from the mobile device or vehicle parameters measured by the vehicle. Alternatively, the replacement map value can be determined by the mobile device and sent to the vehicle, determined by the server and sent to the vehicle or the mobile device, then to the vehicle, or determined by any other suitable system component.

Determining the replacement map value based on the user parameter can include determining the map value based on the user weight, a numerical representation of user experience, user emotion (e.g., as determined from posts generated by the user on a social networking system), biometric measurements, starting location, destination, user preferences, user permissions, user weight distribution across the support surface, user throttle history, vehicle velocity history for the user, or any other suitable user parameter. For example, the replacement map value can be positively correlated with user weight (e.g., higher for a user with a heavier weight, and lower for a user with a lower weight). In another example, the replacement map value can be decreased in response to an excited user state (e.g., as determined from the biometric measurement). In another example, the replacement map value can be decreased in response to an angry user emotional state (e.g., as determined from keyword analysis of the social networking system posts). In another example, a first replacement map value can be selected for a first experience level, a second replacement map value can be selected for a second experience level, wherein second value is higher than the first value if the second experience level is higher than the first experience level. In another example, a first replacement map value can be selected for a first user weight, a second replacement map value can be selected for a second user weight, wherein second value is higher than the first value if the second weight is higher than the first weight. Alternatively, the replacement map values can be proportional to the user weight or otherwise calculated Determining the replacement map value based on the user parameter can include determining the map value based on the instantaneous vehicle acceleration, vehicle velocity, wheel velocity, historical vehicle acceleration, or any other suitable vehicle parameter. For example, the difference between the replacement map value and the default map value can be positively correlated with the vehicle velocity.

Determining the replacement map value based on the user parameter can include assigning the map value used just prior to detection of perturbation condition as the replacement value, wherein the map values can be recorded (e.g., continuously or at predetermined frequencies) for a predetermined period of time during vehicle operation by the vehicle or the mobile device. For example, the output value just prior to perturbation detection (e.g., assigned to a first throttle value) can be assigned as the replacement output value for a second, instantaneously determined throttle value. In a specific example, determining a replacement output value for a first throttle value (e.g., instantaneous throttle value) includes assigning an output value that was targeted prior to the loss of the drive command as the replacement output value.

Determining the replacement map value based on the user parameter can include assigning the map value mapped to the default input value (e.g., corresponding to the default input position) as the replacement map value. For example, the output value mapped to the default throttle value (e.g., corresponding to the default throttle position) can be assigned as the replacement output value for the instantaneous throttle value.

In one example, imminent user mounting of the vehicle is detected as the perturbation condition (e.g., in response to the vehicle being turned on, in response to the vehicle detecting the user mobile device within a predetermined range of the vehicle, etc.). The perturbation condition is preferably detected prior to receipt of a drive command and/or a throttle value, such that the instantaneous throttle value being used is the default throttle value. However, the perturbation condition can be detected at any other suitable time. In response to determination of the perturbation condition, a replacement output value that increases drag on the vehicle is selected for the default throttle value. More preferably, a replacement output value is dynamically selected that counteracts any externally applied force on the vehicle, in response to receipt of the externally applied force. However, any other suitable replacement output value can be selected. The amount of drag (e.g., the amount the replacement output value deviates from the default output value) preferably varies based on a user parameter, but can alternatively be based on any other suitable parameter. For example, the amount of drag can be inversely correlated with the amount of user experience. In another example, a first amount of drag is selected for an excited user (e.g., as measured from social network system post analysis or biometric data), and a second amount of drag is selected for a despondent or fatigued user (e.g., as measured from social network system post analysis or biometric data). However, the amount of drag can be otherwise determined.

Controlling vehicle operation based on the replacement map value S300 functions to mitigate the effects of vehicle perturbation. Controlling vehicle operation can include adjusting the map values on the default map to the replacement map values, can include setting the replacement map values as target values, can include instantaneously changing vehicle operation to meet the replacement map values, or controlling vehicle operation in any other suitable manner based on the replacement map value. In one example, power provision to the motor is controlled to maintain a supply parameter (e.g., to the motor) or output parameter (e.g., output of the motor, performance parameter, etc.) within predetermined range or threshold of the target output value. The predetermined range can be determined as a percentage of the output value, be a scalar value range, or be any other suitable range. The range is preferably centered about the target output value, but can alternatively be skewed relative to the target output value.

Controlling vehicle operation can additionally or alternatively include adjusting the map value mapped to the input value from a first map value to a second map value. Alternatively, the input value to which the throttle positions can be adjusted. Adjusting the map value preferably includes smoothly transitioning from the first map value to the second map value (e.g., transition smoothing), but can alternatively abruptly or suddenly transition from the first to the second value. A perturbation filter (e.g., jerk filter) is preferably applied to the adjustment or to the vehicle response in general, but the adjustment can alternatively be unfiltered or filtered by another filter. For example, the output value mapped to the throttle value can be adjusted from a first output value to a second output value. The first map value can be the replacement map value and the second map value can be the default map value for the throttle value, wherein adjusting the map value includes regaining the default map value mapped to the throttle value. Alternatively, the first map value can be the default map value and the second map value can be the replacement map value, wherein the map value corresponding to the input value is gradually adjusted from the default map value to meet the replacement map value. However, the map values can be otherwise controlled. The adjustment is preferably a linear adjustment, but can alternatively be scaled or curved. The map values are preferably adjusted at predetermined increments, but the adjustment increments can alternatively be dynamically determined, vary as a function of adjustment time, vary as a function of proximity to the second map value, or be determined in any other suitable manner. The map values are preferably changed at or slower than the map value change rate limit, but can alternatively change faster than the map value change rate limit, dependent upon the type of perturbation detected.

In one variation, controlling vehicle operation includes controlling vehicle operation (e.g., vehicle output) to gradually match the replacement map value. For example, the target vehicle output can be incrementally changed from the default map value for the throttle value to the replacement map value at a map value change rate or over a predetermined period of time. In a specific example, the controlling vehicle operation includes incrementally adjusting the output value mapped to the throttle value from the replacement output value to the default output value as determined on the default throttle map. The vehicle operation is preferably controlled to maintain the actual output value (e.g., measured output value) within a predetermined range (e.g., margin of error) of the target adjusted output value, but can alternatively be controlled to match the target adjusted output value.

In another variation, controlling vehicle operation includes controlling vehicle operation to substantially instantaneously meet the replacement map value. The vehicle operation is preferably subsequently controlled to gradually regain the default map value for the given throttle value or output value. The map value change rate is preferably limited, and can be predetermined or selected based on user parameters or vehicle parameters. The rate at which the actual output is changed preferably does not exceed the map value change rate, but can alternatively exceed the map value change rate (e.g., when vehicle operation is substantially instantaneously changed to meet the replacement output value). For example, controlling vehicle operation includes incrementally adjusting the output value mapped to the throttle value from the replacement output value to the default output value, wherein the default output value was determined from the default throttle map. The vehicle operation is preferably controlled to maintain the actual output value (e.g., measured output value) within a predetermined range (e.g., margin of error) of the target adjusted output value, but can alternatively be controlled to match the target adjusted output value.

The method can additionally include detecting instantaneous vehicle operation parameters. The vehicle operation parameters can include the lateral speed or acceleration of the vehicle (e.g., speed or acceleration in a vector parallel to the longitudinal axis of the support surface), the wheel speed or acceleration (angular), the throttle position, drive controller position, load parameters, or any other suitable vehicle operation parameters. The vehicle operation parameters can be measured by vehicle sensors, mobile device sensors, or sensors of any other suitable system component. The vehicle operation parameters can be measured or calculated. For example, vehicle velocity can be measured by an accelerometer on the vehicle or the mobile device, estimated from the wheel speed or acceleration, or determined in any other suitable manner. The wheel speed or acceleration can be determined from an encoder (e.g., arranged on a driven wheel or a non-driven wheel).

The method can additionally include determining a user parameter. The user parameter can be determined at the mobile device, at the vehicle, at a remote server, or at any other suitable system component. The user parameter is preferably calculated, but can alternatively be measured.

In one variation, a user parameter is determined by the mobile device by retrieving the user parameter from mobile device memory. In another variation, the user parameter is determined by the mobile device from sensor measurements. In another variation, a user parameter is determined by the remote server by retrieving the user parameter from the remote server. In another variation, the user parameter can be determined at the vehicle, user mobile device, or the remote server by retrieving content generated by the user or content generated by connections of the user account from the social networking system and processing the content to extract a user parameter of interest, such as keywords, location, emotion, or other parameter indicative of user context.

The method can additionally include determining a user weight or mass. The user weight (or mass) can be determined from the remote server, by the mobile device, or by the vehicle. In one variation of determining the user weight from the remote server, the mobile device or vehicle sends a request to the remote server in response to determination of user proximity with the vehicle including a user identifier. The weight associated with the user identifier stored on the remote server is retrieved and sent to the mobile device or vehicle. However, the user weight can be otherwise determined from the remote server. In one variation of determining the user weight with the mobile device, the mobile device retrieves and sends a stored user weight to the vehicle in response to receipt of a request or detection of proximity to the vehicle. However, the user weight can be otherwise determined by the mobile device. In one variation of determining the user weight with the vehicle, the load on the vehicle can be determined by weight sensors of the vehicle. In another variation of determining the user weight with the vehicle, the user weight can be determined based on the difference between the measured resistance on the wheels or motor and the known resistance on the wheels or motor of the unloaded vehicle (e.g., predetermined or calibrated at a predetermined frequency). In another variation of determining the user weight with the vehicle, the user weight can be determined based on the difference between the measured resultant acceleration (e.g., from vehicle sensors or mobile device sensors) and the anticipated acceleration based on the motor input (e.g., power input). For example, if a higher acceleration or deceleration than expected for the applied power is measured, the estimated mass can be lowered. If a lower acceleration or deceleration than expected for the applied power is measured, then the estimated mass can be increased. In another variation of determining the user weight with the vehicle, the user weight can be determined based on the momentum of the vehicle-user system (e.g., with external measurement markers or an external sensor). However, the user weight can be otherwise determined by any other suitable system component.

The method can additionally include determining whether the user has mounted the vehicle. Determining whether the user has mounted the vehicle can function to trigger a change in the mapped vehicle response. For example, vehicle drag at rest can be removed in response to the user mounting the vehicle. Whether the user has mounted the vehicle can be determined by the mobile device, by the vehicle or by any other suitable system component.

Figure 4:
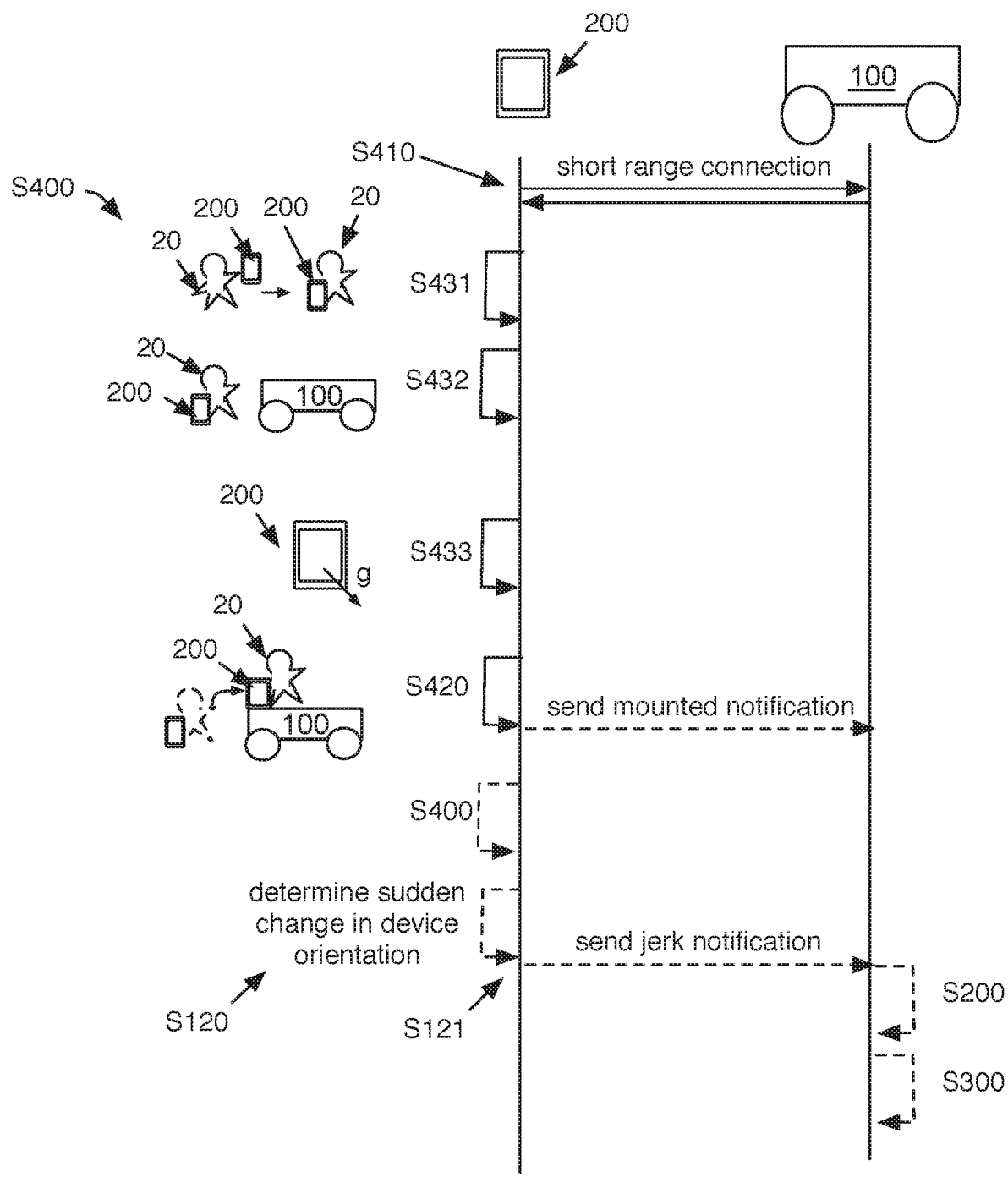
FIG. 4 is a schematic representation of a first example of the method including mobile device orientation calibration.

As shown in FIG. 4, determining whether the user has mounted the vehicle with the mobile device can include detecting user proximity to the vehicle S410 and/or detecting a confirmation of user vehicle mounting S420. Determining whether the user has mounted the vehicle can additionally include establishing a reference point for the mobile device S430, wherein the orientation change can be detected relative to the reference point.

Detecting user proximity to the vehicle S410 functions as a trigger event that triggers (e.g., initiates) monitoring for mounting confirmation. Detecting user proximity to the vehicle can additionally function as a trigger event to initiate reference point establishment (e.g., calibration). Detecting user proximity to the vehicle preferably includes detecting mobile device connection with the vehicle. The connection can be physical or digital. Detecting a connection with the vehicle can include detecting a physical connection of the mobile device with the vehicle (e.g., a wired connection with the vehicle, mobile device coupling with a vehicle mount, etc.). Alternatively, detecting a connection with the vehicle can include connecting with the vehicle over a first short-range communication system (e.g., wherein the vehicle and communication system are powered). The first short-range communication system is preferably limited in range, such that connection is indicative of user proximity to the vehicle (e.g., within the limited range of the vehicle).

Detecting confirmation of user vehicle mounting S420 functions to determine that the user has mounted the vehicle. The confirmation is preferably detected by an active monitoring system that actively monitors for the confirmation event. The monitoring system is preferably activated in response to user proximity detection, but can alternatively be monitoring for the confirmation event at predetermined frequencies or at any other suitable predetermined frequency. Detecting confirmation of user vehicle mounting can include the mobile device detecting a second connection with the vehicle through a second short-range communication system, wherein the second short-range communication system preferably has a shorter range than the first short range communication system. The arrangement of the second short-range communication system in the vehicle preferably results in a range such that mobile device connection with the vehicle limits the user location to that over the support surface. However, the second short-range communication can be otherwise determined.

Alternatively, detecting confirmation of user vehicle mounting S420 can include detecting an orientation change at the mobile device. The orientation change is preferably relative to a reference orientation determined by the mobile device in response to detection of user proximity to the vehicle, but can alternatively be relative to a reference orientation determined by the mobile device in any other suitable manner.

In a first variation, the orientation change can be detected by an altitude change at the user mobile device. The altitude change can be detected by the altimeter, location sensor (e.g., GPS) or any other suitable sensor. The user is determined to have mounted the vehicle when the altitude change is substantially equivalent (e.g., within a margin of error) to the distance of the vehicle support surface from the driving surface. For example, the user can be determined to have mounted the vehicle when the altitude change is substantially equivalent to the radius of the wheels in addition to the distance of the broad surface of the support surface distal the driving surface from the wheel axis of rotation. Additionally or alternatively, the user can be determined to have mounted the vehicle after the altitude change is detected and after the changed altitude has been detected for a threshold period of time after the altitude change was detected, indicative of the user mounting and staying on the vehicle. The threshold period of time is preferably based on the gait of the user (e.g., as determined when the mobile device was determined to be in a pocket, bag, or other storage of the user), wherein the threshold period of time is preferably a longer period of time than it takes for the user to take a step. The gait is preferably measured in response to detection of user proximity with the vehicle, but can alternatively be measured at an earlier point in time and stored. However, the threshold period of time can be predetermined (e.g., 5 seconds) or otherwise determined. Alternatively, the orientation change can be determined in response to determination that the user has taken an incomplete step or a step higher than a typical step (e.g., by a mobile device orientation sensor). This can be determined relative to the recorded gait, as described above, wherein the orientation sensor can measure or record a gait pattern, or a pattern of mobile device movement when stored in user storage. A difference between the measured gait and the recorded gait can be indicative of user mounting the vehicle. Alternatively, a pattern indicative of the user mounting the vehicle can be detected (e.g., by the orientation sensor), wherein the mobile device can be trained to detect such a pattern of orientation changes.

Alternatively, detecting confirmation of user vehicle mounting can be detected by the acoustic sensor of the mobile device. The acoustic sensor can analyze the ambient environment sounds for muffling or rustling above a predetermined threshold, which can be indicative of mobile device storage in user storage. Muffling below a second threshold (e.g., same as the first threshold, alternatively different) can be indicative of the user holding the mobile device or other use of the device, wherein given sensor measurements (e.g., gait recording) can be discounted as confirmations of user vehicle mounting. User vehicle mounting can be confirmed in response to the detected rustling ceasing or falling below a rustling threshold for a threshold period of time.

Alternatively, user vehicle mounting can be confirmed by the vehicle, more preferably by the vehicle sensors. User vehicle mounting can be confirmed by a weight sensor of the vehicle. Alternatively, user vehicle mounting can be confirmed by detecting an amount of resistance on the motor exceeding the resistance on the motor for an unloaded vehicle. Alternatively, user vehicle mounting can be confirmed by wheel motion due to a non-motor force (e.g., motion in excess of estimated wheel motion due to motor force). Alternatively, user vehicle mounting can be confirmed by receipt of a drive command. Alternatively, user vehicle mounting can be confirmed in any other suitable manner by the vehicle. One or a combination of the aforementioned variations is preferably used to confirm user vehicle mounting. However, user vehicle mounting can be otherwise confirmed.

The method can additionally include determining a reference orientation for the mobile device S430, which functions to form a basis for user position parameter measurements. A first reference orientation can be determined prior to user vehicle mounting to determine whether the user has mounted the vehicle, and a second reference can be determined to determine user parameters during vehicle operation. Alternatively, any other suitable number of reference orientations can be determined. Determining the reference orientation for the mobile device preferably includes measuring and storing mobile device sensor measurements at a given time or for a given period of time S433. The reference orientation can be as a set of measurements at one point in time, a set of averaged measurements over a period of time, a pattern of motion defined by multiple sets of measurements, or be any other suitable set of mobile device position and/or orientation data. Measurements or parameters that can define the reference orientation include mobile device tilt along the device longitudinal axis, tilt about the device longitudinal axis, tilt of the device lateral axis, device location, device altitude (e.g., as determined by an altimeter or GPS), or any other suitable or location orientation parameter.

Determining the reference orientation for the mobile device S430 can include detecting the state of the mobile device relative to the user S431, which functions to determine whether the mobile device is in hand, has been stored away within a user storage compartment, such as a pocket or bag, or has been mounted to the vehicle. The reference orientation measurement is preferably measured after determination that the mobile device has been stored away or has been mounted to the vehicle, but can alternatively be measured in response to determination of any other suitable trigger event. In a first variation, detecting the state of the mobile device relative to the user includes detecting physical device connection with the vehicle. In a second variation, detecting the state of the mobile device relative to the user includes detecting a change in the mobile device orientation or position. The reference orientation can be determined in response to detection of a first orientation change, such as a change in the angular orientation of the mobile device to a mobile device position wherein the longitudinal axis is within a predetermined range of a gravity vector (e.g., parallel or substantially parallel with the gravity vector). Alternatively, the reference orientation can be determined in response to detection of a rate of mobile device orientation change falling below a threshold rate of change (e.g., indicative of the mobile device resting in the user storage). Alternatively, the reference orientation can be determined in response to the detection of ambient acoustic noise muffling or detection of an increase in detected rustling. The quality, pattern, or any other suitable parameter of the rustling or muffling can additionally be analyzed to determine which user storage the mobile device is in, wherein the type of user storage can be subsequently used to determine the weighting of sensor measurements for user vehicle mounting detection. The ambient noise can additionally be analyzed to determine the context and/or environment of the user, which can subsequently be used to select the map or map parameters (e.g., type of curve, slope, output value limits, etc.) used to control the vehicle. Alternatively, the reference orientation can be delayed in response to (e.g., not measured as long as) determination that the mobile device is moving in a pattern substantially similar to a predetermined (e.g., prerecorded) pattern for the mobile device known to be held in the hand of the user. Alternatively, the reference orientation can be delayed in response to receipt of input at the mobile device data input (e.g., detection of touch screen use, detection of a button press, etc.) or detection of mobile device display use. The input pattern can additionally be analyzed to determine if the input was deliberate, indicative of user input, or random (e.g., accidental), indicative of non-user action on the input device.

Determining a reference orientation for the mobile device S430 can additionally include determining an unmounted user state S432. Determining an unmounted user state functions to determine that the user has not yet mounted the vehicle. Mobile device reference orientation measurement is preferably triggered in response to determination that the user is in an unmounted state, but can alternatively be triggered in response to determination of any other suitable user state. In one variation, determining an unmounted user state includes detecting mobile device pattern of movement, as determined by the mobile device sensors, that is substantially similar (e.g., matching within a margin of error) to a user gait pattern. The user gait pattern is preferably prerecorded, but can alternatively be determined in response to trigger event detection. Multiple user gait patterns can be recorded, such as a walking gait pattern, running gait pattern, or any other suitable gait pattern. The mobile device movement pattern (e.g., orientation pattern, as determined from the accelerometer or gyroscope) can be coupled with a mobile device translation parameter (e.g., velocity or acceleration) to determine which pre-recorded gait pattern should be used for comparison. In a second variation, determining an unmounted user state can include determining that the second short-range communication system has not connected to the vehicle.

In one example, determining whether the user has mounted the vehicle includes connecting to the vehicle with a user mobile device; measuring a user gait with the mobile device in response to vehicle connection; comparing the measured gait with a historical, recorded pattern of user gait, matched based on the estimated user velocity or otherwise matched, to determine that user is not yet on vehicle; in response to detection of rustling or substantially constant mobile device altitude, determining a reference orientation by measuring the instantaneous orientation of the mobile device, determining the average orientation of the mobile device, or determining a pattern of orientation change; and detecting a change in the mobile device orientation, such as a change in altitude or a deviation from the orientation change pattern.

The method can additionally include determining the angular orientation of the user on the vehicle, which can be subsequently used to select the replacement map value. This is preferably determined after user vehicle mounting is detected, but can alternatively be determined during vehicle operation (e.g., while the user is riding the vehicle), or at any other suitable time. This is preferably determined once, but can be determined at any other suitable frequency. The lean can be the difference between the user center of gravity and the center of the user base or be otherwise determined. Examples of angular orientation of the user include the amount of lean forward, backward, to the right, or to the left. The lean can be determined by the mobile device or by the vehicle. In one variation, the lean can be determined by the mobile device, wherein the lean is determined relative to the reference orientation, as measured by the mobile device while the user is standing, walking, or otherwise off the vehicle. The angular difference between the mobile device position (e.g., as determined by the gyroscope or accelerometer) after detection of user vehicle mounting and the reference position is preferably used as the angular orientation of the user on the vehicle. Alternatively, the lean can be determined from the acoustic sensor of the mobile device, wherein the determined direction of rustling can be used to determine the direction of user lean. In another variation, the lean can be determined by the vehicle. The lean can be determined by a set of weight sensors on the vehicle, wherein the user lean can be determined from the difference in measured force between a first and a second sensor (e.g., wherein the user is determined to lean toward the sensor measuring a higher force). Alternatively, the lean can be determined based on the resistance on a wheel relative to another wheel, wherein the user is determined to be leaning toward the wheel experiencing the higher resistance. However, the angular orientation of the user on the vehicle can be otherwise determined.

The method can additionally include determining the linear position of the user on the vehicle (e.g., the user weight distribution across the support surface). The linear position can also be subsequently used to select the replacement map value. In a first variation, the linear position of the user on the vehicle can be determined by the mobile device. The linear position of the user can be determined by a triangulation mechanism of the mobile device, based on transmitters on the vehicle. However, the linear position can be otherwise determined by the mobile device. In another variation, the linear position of the user can be determined by the vehicle. The linear position of the user can be determined based on a set of weight sensors of the vehicle, wherein the user is determined to be located at the locations corresponding to the weight sensors measuring an applied force. The linear position of the user can be determined based on the relative resistance between the front and back wheels, from the resistance on the motor, from the resultant acceleration (e.g., difference between the measured acceleration and the anticipated acceleration), or from any other suitable vehicle parameter. However, the linear position can be otherwise determined by the vehicle.

The method can additionally include determining the characteristics of the terrain or environment of the vehicle. The vehicle preferably operates in different modes (e.g., operates based on different throttle maps) in different terrain. For example, the vehicle can operate in a first mode (e.g., based on a first throttle map, have a different output value change rate limit, etc.) in an environment with car traffic, and in a second mode in an environment without car traffic. The ambient environment type can be determined based on the acoustic sensor of the mobile device (e.g., using acoustic pattern matching), based on the orientation sensor of the mobile device or vehicle (e.g., using vibration pattern matching), or determined in any other suitable manner.

The method can additionally include determining the pitch of the vehicle, which functions to determine whether the vehicle and/or user are on an incline or a decline. The angle of a longitudinal axis relative to a gravity vector (e.g., the angle of the incline) is preferably determined, but the angle of the lateral axis relative to the gravity vector or any other suitable parameter indicative of pitch can be determined. The pitch of the vehicle can be determined with the mobile device, using orientation sensors, such as the accelerometer, gyroscope, altimeter, or barometer, location sensors (e.g., GPS) coupled with a terrain map, or determined in any other suitable manner. Alternatively the pitch of the vehicle can be determined with the vehicle, using vehicle sensors, a difference between anticipated vehicle speed given the wheel acceleration and the measured vehicle speed exceeding a threshold difference (e.g., wherein the vehicle is on a decline if the difference is negative and on an incline if the difference is positive), or determined in any other suitable manner.

The method can additionally include determining user emotion, which can also be used to select the default map, the replacement map value, or the map limits. The user emotion is preferably determined by the remote server and sent to the mobile device, wherein the mobile device determine map parameters or generates instructions for the vehicle based on the user emotion. Alternatively, the remote server can determine map parameters or generate instructions, which are sent to the vehicle either directly or through the mobile device. Alternatively, the user emotions can be determined by the mobile device. The user emotion can be determined in response to mobile device connection with the vehicle or in response to detection of any other suitable event indicative of imminent vehicle operation, wherein the mobile device can send a request to the remote server. The user emotion is preferably determined from keyword, sentiment, or other analysis of the content posted by the user on one or more social networking systems (e.g., through the mobile device or in association with a user identifier, such as a user name, associated with the mobile device). The content within a threshold period of time prior to detection of the event indicative of imminent vehicle operation is preferably analyzed (e.g., content posted within an hour of the event), but any other suitable content can be analyzed. Content generated by user connections can additionally be analyzed. In one example, in response to determination that the user is angry, the throttle map can be adjusted to be less responsive. In another example, in response to determination that the user is tired, the throttle map can be selected or adjusted to be less responsive. Vehicle operation can additionally be controlled to incorporate perturbations to keep the user awake. User perturbation tracking can additionally be activated on the vehicle and/or mobile device to detect whether the user is falling asleep. In another example, in response to determination that the user is excited, the throttle map can be selected or adjusted to be more responsive.

The method can additionally include determining user context S500, which can also be used to select the default map, the replacement map value, or the map limits. The user context can additionally be used to control vehicle operation. For example, the vehicle can be controlled to guide the user along a drive route that is selected by the user or automatically selected. The starting point is preferably determined by the location sensor of the mobile device or vehicle, but can alternatively be determined from a post on a social networking service or determined in any other suitable manner. The destination can be determined from a calendar (e.g., on the mobile device or by the remote server), received at a mapping application, or otherwise determined. The desired time of arrival can additionally be determined from the calendar or from any other suitable source. The throttle map can be determined from the terrain and/or environment that the selected or recommended route passes through, how late the user will be, or based on any other suitable contextual variable. For example, a more aggressive map (e.g., with a higher slope) can be selected in response to the estimated time of arrival falling a threshold amount behind the appointment time (e.g., the user estimated to be late by 15 minutes), and a more lenient map (e.g., with a lower slope) can be selected in response to the user estimated to arrive earlier than the appointment time.

The method can additionally include determining the substantially instantaneous user energy state. The user energy state can be determined using a secondary user device, such as a smartwatch, wherein the secondary user device can determine the energy state by matching physiological measurements, such as blood pressure, pulse, body temperature, perspiration, oxygenation, or any other suitable parameter, to predetermined patterns corresponding to given energy states or classifications. Alternatively, the user energy state can be determined using the mobile device, wherein the motion sensor can detect user movement patterns consistent with falling asleep or fatigue (e.g., detect a slow pitch forward or swaying), or used to detect any other suitable user pattern. Alternatively, the user energy state can be determined from audio analysis, such as detecting an audio pattern substantially matching "I'm so tired" in the voice of the user. Alternatively, the user energy state can be determined from social network system analysis, such as detecting keywords indicative of a physiological state. However, any other suitable method can be used to determine the user physiological state. User excitement, fatigue, or any other suitable physiological energy state can be determined, wherein the vehicle operation can be adjusted to accommodate for the energy state. For example, intentional perturbations can be incorporated periodically, randomly, or in response to determination that the user is falling asleep to wake the user up. In another example, the perturbation can be timed such that the vehicle perturbations in the direction that the user is swaying to catch the user. In another example, a different throttle map can be selected when the user is determined to be excited or to need exercise. However, vehicle operation can be otherwise modified to accommodate for user energy states.

The method can additionally include selecting a second output change rate limit. The second output change rate limit is preferably selected in response to receipt of a drive command, then receipt of a throttle value above a threshold value. This pattern of drive value receipt can be indicative of a desire to rapidly accelerate, or can be indicative of a mistake in user input. In the former case, the vehicle output is preferably controlled to rapidly increase from the standby output value (mapped to the default throttle value) to the output value mapped to the received throttle value. The output value change rate preferably changes at the output change rate limit, but can alternatively change at the second output change rate limit, wherein the second output change rate limit can be higher than the first output change rate limit. In the latter case, the vehicle output can also be controlled to increase from the standby output value (mapped to the default throttle value) to the output value mapped to the received throttle value, but at a slower output value change rate than the second output value change rate. Which operation case should be used is preferably determined based on the riding experience of the respective user, but can alternatively be otherwise determined. The second output change rate limit is preferably selected based on user parameters, such as experience (e.g., the second output change rate limit can positively correlate with experience), or can be otherwise determined.

3. Examples of the Method

In a first example, the method mitigates perturbation due to user throttle selection before drive initiation. As shown in FIG. 5, the method includes determining that a vehicle position parameter (e.g., velocity, acceleration, wheel velocity, etc.) is below or equal to a threshold value (e.g., wherein the threshold value is 0 m/s$^2$), receiving a first throttle value from the throttle, wherein the first throttle value is beyond a predetermined range relative to the default throttle value (e.g., near the maximum throttle value), and receiving a drive command after receipt of the throttle value beyond the predetermined range; selecting a replacement output value closer to the standby output value (mapped to the standby throttle value) than the default output value mapped to the throttle value; operating the vehicle to meet the replacement output value in response to receipt of the drive command (e.g., remapping the throttle value to the replacement output value); and incrementally adjusting the output value mapped to the throttle value back to the default output value. The replacement output value is preferably the standby output value, but can alternatively be any other suitable value. The output value is preferably changed at a rate substantially equivalent to the output value change rate limit, but can alternatively be selected based on user parameters, or otherwise determined.

In a second example, the method mitigates perturbation due to a high user throttle selection within a threshold period of time (e.g., substantially instantaneously) after drive initiation. This could accommodate for a rapid throttle value change (e.g., decrease or increase). As shown in FIG. 6, the method includes detecting a vehicle position parameter (e.g., velocity, acceleration, wheel velocity, etc.) falling below or equal to a threshold value (e.g., wherein the threshold value is 0 m/s$^2$), receiving a drive command, and receiving a first throttle value from the throttle after receipt of the drive command, wherein the first throttle value is beyond a predetermined range relative to the default throttle value (e.g., near the maximum throttle value); selecting a replacement output value closer to the standby output value (mapped to the standby throttle value) than the default output value mapped to the throttle value; operating the vehicle to meet the replacement output value in response to receipt of the drive command (e.g., remapping the throttle value to the replacement output value); and incrementally adjusting the output value mapped to the throttle value back to the default output value, such that the output increases over time. The method can alternatively include detecting a throttle position change or a throttle value change beyond a threshold rate of change instead of receiving a first throttle value from the throttle after receipt of the drive command. The threshold rate of change is preferably predetermined, but can alternatively be selected based on user parameters or otherwise selected. The replacement output value is preferably the standby output value, but can alternatively be the output value mapped to the last throttle value prior to throttle change or any other suitable value. The output value is preferably changed at a rate substantially equivalent to the output value change rate limit, but can alternatively be selected based on user parameters, or otherwise determined. The output change rate limit for the second example is preferably higher than that for the first example (preceding example), but can alternatively be the same or lower.

Figure 7:
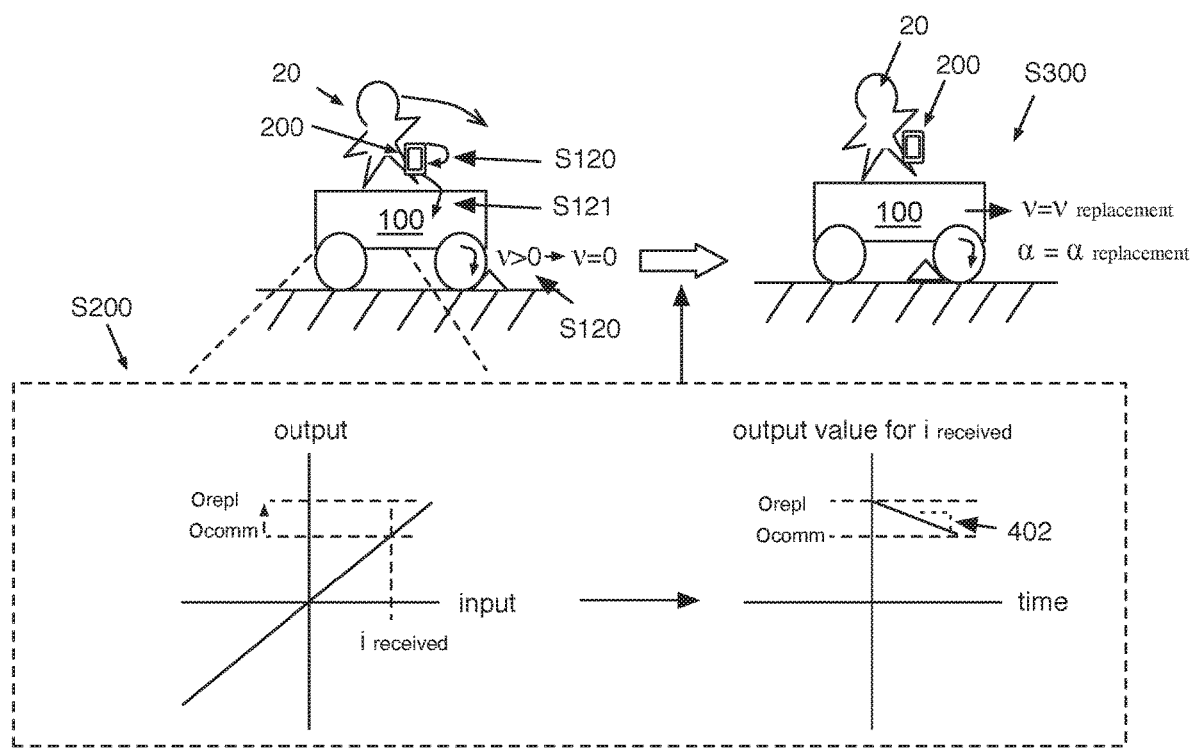
FIG. 7 is a schematic representation of a fourth example of the method including perturbation detection in response to sudden vehicle halting.

In a third example, the method mitigates perturbation due to sudden wheel or vehicle halt, such as due to sudden braking, hitting an obstacle, or any other suitable halting event. As shown in FIG. 7, the method can include detecting a near-instantaneous or rapid rate of change (e.g., beyond a threshold difference within a threshold period of time) in the wheel angular velocity, wheel angular acceleration, vehicle velocity, vehicle acceleration, user velocity, user acceleration, or in any other suitable parameter. For example, the perturbation condition can be detected when the vehicle or wheel velocity decreases at a rate faster than a predetermined deceleration threshold (e.g., 5 m/s$^2$). In another example, the perturbation condition can be detected when the vehicle or wheel acceleration decreases at a rate faster than a predetermined perturbation threshold (e.g., 1 m/s$^3$). In another example, the perturbation condition can be detected when the user acceleration increases at a rate above a predetermined perturbation threshold, or when the user velocity increases at a rate above a predetermined acceleration threshold. In a specific example, the perturbation condition is only detected when a rapid change in user position is detected after a rapid change in vehicle or wheel velocity or acceleration. In this specific example, user position change detected before vehicle or wheel velocity or acceleration change can be indicative of a user-desired stop. In another example, the perturbation condition is detected when a difference between the user acceleration and the vehicle acceleration exceeds a threshold difference. However, the perturbation condition can be otherwise determined. The replacement output value is preferably selected to substantially regain the prior user, vehicle, or wheel velocity or acceleration, or to minimize the difference between the user acceleration and the vehicle acceleration. For example, the vehicle can be operated to drive the stopped wheels in the direction of previous travel. In another example, the direction of user acceleration or velocity can be determined, wherein the vehicle is driven in the determined direction of the user. The selected replacement map value is preferably high enough overcome the halting force (e.g., estimated or incrementally determined), but can be otherwise selected.

Figure 9:
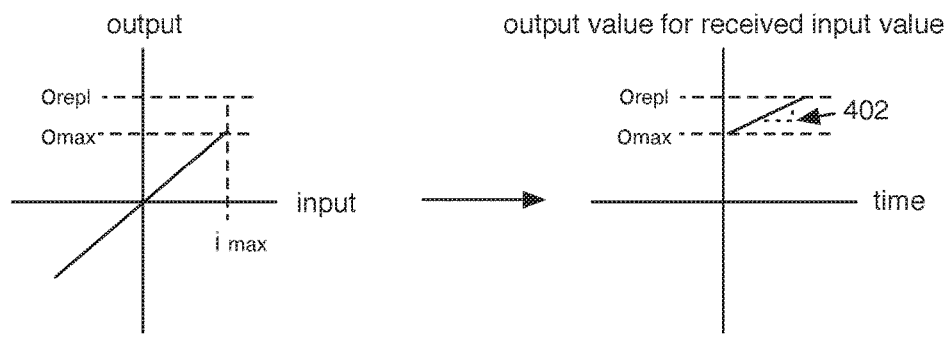
FIG. 9 is a schematic representation of map adjustment to accommodate for an increased power requirement.

In a fourth example, the method accommodates for a higher power requirement when driving up inclines. As shown in FIG. 9, in response to receipt of the maximum throttle value beyond threshold period of time (e.g., the maximum throttle position being retained or held for the threshold period of time), the throttle map can be deformed such that the value mapped to the maximum throttle value is increased. The output value can be substantially instantaneously increased to the increased replacement map value, but is preferably incrementally adjusted to the increased replacement map value at the output value change rate limit or at any other suitable output value change rate. The replacement map value is used as the value mapped to the maximum throttle value as long as the maximum throttle value is substantially constantly received. The output value mapped to the maximum throttle value is preferably reassigned back to the default output value in response to receipt of a throttle value outside of a predetermined range from the maximum throttle value (e.g., the map preferably deforms back to the pre-existing values in response to throttle retraction from maximum throttle position). However, a request or need for increased power can be otherwise accommodated.

Figure 10:
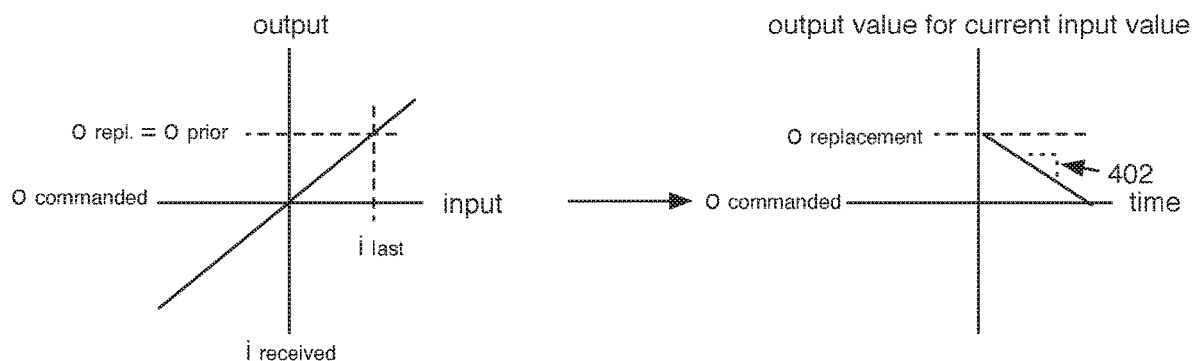
FIG. 10 is a schematic representation of map adjustment to accommodate for drive command loss.

In a fifth example, the method accommodates for a loss of a drive command. In conventional electric vehicles, a loss of the drive command would result in the throttle value falling to the default throttle value, resulting in either automated braking or cessation of power provision to the motor. This can result in perturbation if the vehicle is accelerating or travelling at high speeds, which could result in user pitching because the user is positioned to accommodate for the acceleration or speed and is not positioned to accommodate for a sudden reduction in acceleration or speed. As shown in FIG. 10, this method includes detecting a lost drive command, lost connection to the drive controller, or detecting a throttle position change beyond threshold change rate (e.g., the throttle value decreases faster than the threshold throttle value change rate) as the perturbation condition, detecting vehicle or wheel acceleration above a threshold acceleration (e.g., above 0 m/s$^2$), and remapping the default throttle value to a replacement output value in response to detection of the perturbation condition and the acceleration exceeding the threshold acceleration. The replacement output value is preferably higher than the default output value assigned to the default throttle value. More preferably, the replacement output value is the output value just prior to drive connection loss or throttle value change, wherein the vehicle or mobile device preferably caches the target or actual vehicle output values for a predetermined period of time (e.g., keeps the values for 5 minutes after use). The replacement output value is preferably selected to maintain the vehicle acceleration, then incrementally adjusted to reduce the vehicle acceleration and/or vehicle velocity. The replacement output value can additionally be selected based on whether the vehicle is on an incline or a decline. In one specific example, the replacement output value can be incrementally adjusted to gradually decrease the vehicle velocity to zero (e.g., when the vehicle is detected to be on a slope). In another specific example, the replacement output value can be incrementally adjusted to gradually decrease the vehicle velocity to a substantially constant coasting speed.

Figure 11:
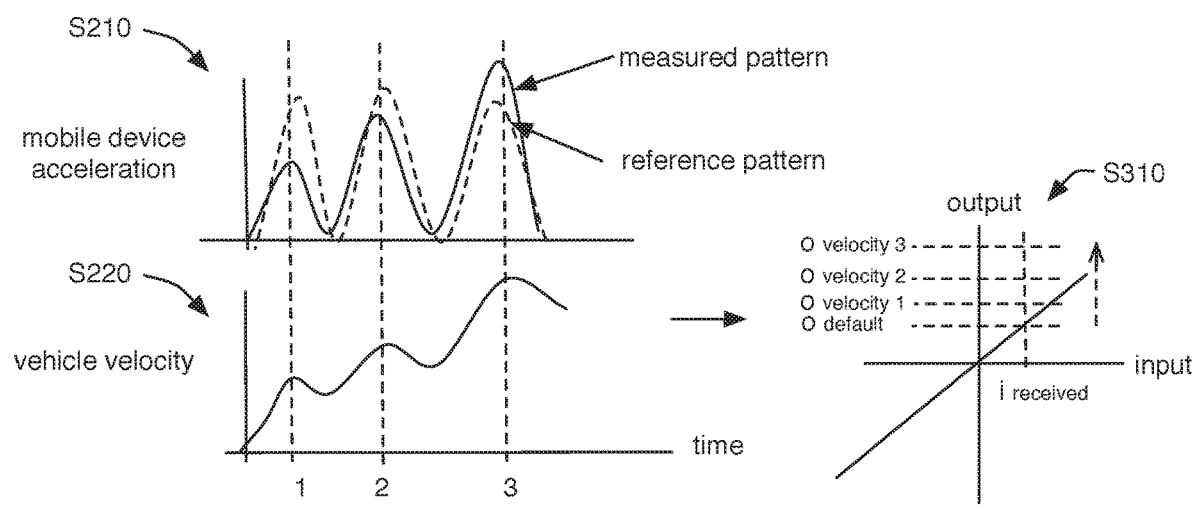
FIG. 11 is a schematic representation of map adjustment in response to external force application.

In a sixth example, the method adjusts vehicle operation to accommodate for an applied external force. As shown in FIG. 11, the method can include detecting an externally applied force (e.g., from user propulsion) S210, detecting a resultant vehicle velocity S220, and controlling vehicle operation to substantially maintain (e.g., within a margin of error) the detected vehicle velocity S310. The externally applied force can be detected at the vehicle or at the mobile device. The vehicle can detect the externally applied force when the wheel acceleration is different from that expected based on the instantaneous power to the wheels, accounting for resistance provided by the load on the vehicle. In one variation, the wheel or vehicle acceleration or velocity is measured for a given output value (e.g., motor output or input), and the externally applied force is detected when the wheel or vehicle acceleration or velocity deviates from the previously measured acceleration or velocity (e.g., in the same drive) by a predetermined threshold. An increased wheel acceleration is preferably indicative of forward propulsion, whereas decreased wheel acceleration is preferably indicative of braking. The externally applied force can additionally or alternatively be detected at the mobile device. The mobile device can detect a mobile device movement pattern consistent with forward propulsion by the user (e.g., a cyclic motion in a plane substantially parallel to the gravity vector). The mobile device can additionally detect mobile device movement pattern consistent with deceleration by the user. For example, the mobile device can detect a lateral shift in mobile device position, an altitude change, a substantially constant altitude change, or any other suitable movement pattern consistent with vehicle deceleration by the user.

In response to external force application by the mobile device, the mobile device preferably sends an acceleration or deceleration signal to the vehicle, wherein the vehicle preferably determines an increased replacement output value for the throttle value based on the signal. The signal can include an acceleration or deceleration amount based on the estimated magnitude of the external force (e.g., as determined from velocity, frequency, etc.). Alternatively, the wheel acceleration or deceleration rate can be predetermined or otherwise determined. Alternatively, a predetermined or otherwise selected vehicle acceleration or deceleration can be maintained as long as the pattern is detected.

The vehicle can assist with the propulsion or deceleration in response to external force detection (e.g., increases or decreases the output value for the throttle value, respectively), can continue to maintain the same output value for the throttle value, can maintain the resultant velocity (e.g., highest or average), or can otherwise be operated in response to application of the external force. The vehicle preferably maintains the resultant vehicle velocity in response to cessation of pattern detection. The vehicle velocity can be maintained by the vehicle (e.g., wherein the throttle map can be adjusted) or by the mobile device (e.g., wherein the device sends an acceleration signal each time the mobile device velocity falls below a predetermined range of the resultant velocity). Vehicle or wheel velocity is preferably detected by the wheel encoder, but can alternatively be detected by the vehicle or mobile device position sensor (e.g., accelerometer) or determined in any other suitable manner.

In a seventh example, the method adjusts vehicle operation to accommodate for lost traction. The method preferably includes measuring the wheel acceleration, measuring the vehicle acceleration or mobile device acceleration (e.g., along the direction of travel), and determining if the wheel acceleration exceeds the estimated wheel acceleration for the measured vehicle or mobile device acceleration. Slip or loss of traction is determined by the vehicle or mobile device when the wheel acceleration exceeds a predetermined range of the estimated wheel acceleration. Power to the slipped wheel is preferably controlled to reduce the wheel acceleration to the estimated wheel acceleration or the acceleration of a second wheel of the vehicle.

The method can additionally include differential control based on vehicle speed, wherein the output values can be adjusted based on measured vehicle velocity. For example, at high speeds, a slight lean or adjustment in load weight can result in a large turn response, while the same lean at low speeds can result in a small turn response.

The method can additionally accommodate for user weight. The user weight can be determined using the methods described above, and the throttle values remapped to replacement output values or a new map selected based on the weight. For example, a map having a first slope can be selected for a user with a first weight (e.g., below a threshold weight), and a map having a second slope steeper than the first slope can be selected for a user having a second weight higher than the first weight.

Figure 8:
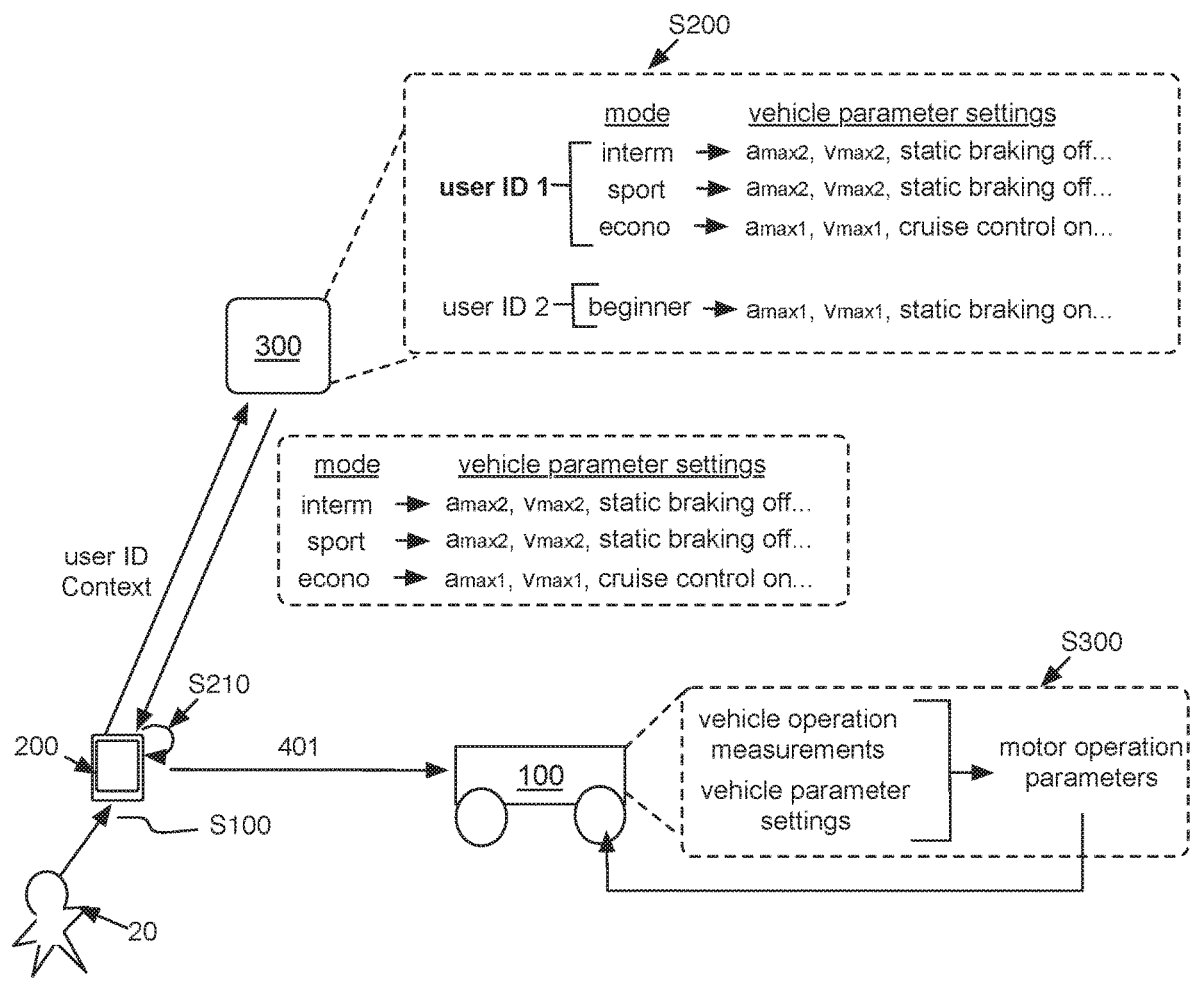
FIG. 8 is a schematic representation of map selection based on user experience and context.

The method can additionally accommodate for user experience. As shown in FIG. 8, the user experience can be determined from stored user preferences (e.g., retrieved based on a user identifier associated with the mobile device, stored by the device, or stored by the vehicle), from historical riding patterns, or otherwise determined. The difficulty or responsiveness of the map or replacement output values preferably positively corresponds with the experience level (e.g., as measured with a scalar), but can alternatively be otherwise determined based on the experience level. For example, a default map with a steeper curve can be selected for a more experienced user. In another example, the amount of brake application at rest is decreased with increased user experience. Select vehicle operations can additionally be permitted based on the experience level. For example, smooth transitioning between forward and backward translation (e.g., movement in a first and second opposing direction along the vehicle longitudinal axis) during vehicle drive can be permitted for a user with high experience, while backward translation can be prevented or require additional input (e.g., require a receipt of two drive commands in quick succession) for a user with low experience.

The method can additionally accommodate for user history, wherein the maps can be adjusted based on the historical throttle patterns or riding patterns of a given user. The user history can be determined in a similar manner to how user experience was determined, as described above, but can alternatively be otherwise determined. Each ride history is preferably recorded by the vehicle and stored in the vehicle, mobile device, or remote server. Alternatively, the throttle, drive controller, or any other suitable component can measure and/or store the ride history. The ride history can include throttle values, output values, vehicle position parameters, mobile device position parameters, or any other suitable parameter. In one variation, if analysis of the user history shows that the user stays within a threshold throttle value for a threshold proportion of the riding time, the map can be adjusted such that the output value mapped to the threshold value is remapped to the maximum throttle value. Alternatively, the slope of the map curve can be decreased (e.g., flattened). In another variation, if a predetermined pattern (e.g., an increase in throttle value followed by a rapid decrease) is detected in the user history, the maximum output value can be lowered or the map curve flattened. In another variation, if analysis of the user history shows that the user stays above a threshold throttle value for a threshold proportion of the riding time, the map can be adjusted such that the maximum output value is increased or the slope of the map curve increased. However, the map and replacement output values can be otherwise selected or adjusted based on the user history.

The method can additionally include facilitating user navigation from a first location to a second location. Navigation is preferably facilitated by providing less maneuvering resistance for vehicle travel along a predetermined route, and providing more resistance for vehicle travel outside the predetermined route. Alternatively, vehicle travel along the predetermined route can be assisted. For example, when the directions indicate a right turn, more power can be supplied to the left wheels and less power supplied to the right wheels. The navigation instructions (e.g., how to selectively power the wheels) are preferably generated by the mobile device and sent to the mobile device in real time or a predetermined period of time before anticipated use. However, the instructions can be determined by the remote server, the vehicle, or determined in any other suitable manner by any other suitable component. In one variation, the mobile device determines the route directions and sends the route directions to the vehicle, wherein the vehicle determines throttle mapping adjustments (replacement output values) based on the route directions. The route is preferably selected by the user, but can alternatively be automatically determined by the system (e.g., from the instantaneous location of the user or mobile device and a received or determined target destination) or otherwise selected. The system can automatically select a new route in response to determination that user veered from predetermined course, as determine by the mobile device location sensor or orientation sensor, or by the relative resistance on the wheels or motors. However, navigation can be otherwise facilitated by the system.

The method can additionally include determining the context of the drive, and select maps, replacement output values, output value change rate limits, or any other suitable parameter based on the drive context. For example, the system might select a map with a lower maximum output value when a commuting context is determined (e.g., between the hours of 8 am and 10 am on a weekday) relative to a map selected when a sport context is determined (e.g., when the mobile device location corresponds to a skate park or race track venue). In another example, the system might select or adjust a map to accommodate for lower power consumption in response to determination of the SOC (state of charge) of an energy storage unit falling below a threshold value. The context can automatically determined by the remote server, mobile device, or vehicle based on the time of the ride, the location of the vehicle or mobile device, the user calendar, historical riding patterns, or any other suitable user parameter.

The method can additionally accommodate for regulatory differences across geographic regions. The method can include determining the geographic region with the location sensor of the mobile device or vehicle, retrieving the regulatory vehicle operation limitations (e.g., power limitations, torque limitations, etc.) for the respective geographic region from a stored database or a remote database, and adjusting the maps to account for the limitations, such as by limiting the maximum output value mapped to the maximum input value. However, the system can otherwise accommodate for differences in regulations across geographic regions. However, the system and method can include any suitable combination of the aforementioned examples and variants.

Figure 12:
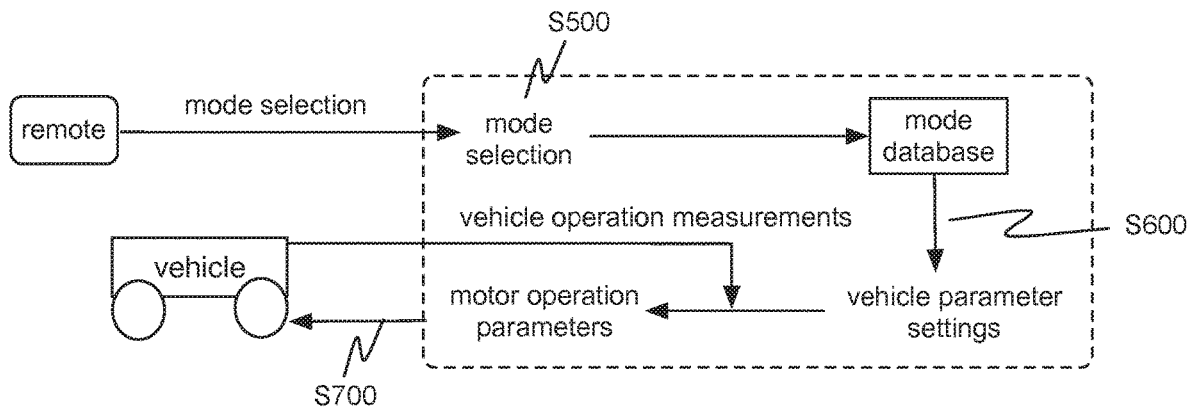
FIG. 12 is a schematic representation of the method of vehicle response control.

As shown in FIG. 12, the method of vehicle response control includes determining a mode selection S500, determining vehicle parameter settings associated with the selected mode S600, and controlling the operation parameters of the motor based on the determined vehicle parameter settings S700. This method functions to control the performance of an electric vehicle. More preferably, this method accommodates for the driving expertise of the rider, and tailors the vehicle driving experience to meet rider expectations.

The method is preferably performed by vehicle system including a vehicle and a remote. The vehicle is preferably an electric vehicle that is driven by one or more drive trains, wherein each drive train preferably drives one or more wheels. The drivetrain preferably includes an electric motor, and can additionally include a transmission connected to the motor or any other suitable drive train element. The electric motor is preferably a permanent magnet motor, but can alternatively be a DC motor, AC motor, or any other suitable motor. The vehicle preferably additionally includes one or more wheels driven by the electric motor. The vehicle preferably additionally includes a motor controller that controls electric motor operation, and can additionally include sensors that measure motor operation parameters (e.g., current sensors, encoders, etc.) and/or sensors that measure vehicle operation parameters (e.g., accelerometer, gyroscope, remote sensing mechanism, etc.). The vehicle can additionally include a processor that functions to receive measurements from the sensor, determine motor operation parameter adjustments or target motor operation parameters based on the measurements, and send control instructions to the motor controllers to operate the motors at the target operation parameters. Alternatively, a portion or all of the processing and control instruction generation can be performed by the remote and/or received from an external source (e.g., a networked server). The vehicle can additionally store a unique identifier for a user. The vehicle can additionally access a server and retrieve information (e.g., motor operation permissions and/or settings) associated with the unique identifier in response to a retrieval event (e.g., the initiation of a new driving session, etc.). The vehicle can additionally store motor operation permissions and/or settings. The vehicle can additionally store historical vehicle use patterns for the user. The vehicle preferably additionally includes a data link to the remote. The data link can be a wired connection extending from the vehicle to the remote, or can be a wireless connection, wherein the vehicle and remote each include a complimentary transmitter and receiver pair. The vehicle preferably additionally includes an energy storage device, such as a rechargeable battery. The vehicle is preferably substantially lightweight, and is preferably capable of moving in response to a propulsion force generated by a user when the user is in the riding position. Alternatively, the vehicle can remain substantially static in response to a user-generated propulsion force, wherein the vehicle can require an actively driven drive train to move. The vehicle can be a motorized skateboard substantially similar to the vehicle described in U.S. application Ser. No. 13/645,388 filed 4 Oct. 2012, but can alternatively be a motorized kick scooter, a motorized bicycle, a motorized pair of skates, or any other suitable lightweight transportation device.

The remote of the vehicle system functions to receive a user input and to transmit a signal associated with the user input to the vehicle. The remote can additionally process the user input into control instructions that are sent to the vehicle. The remote can additionally store a unique identifier for a user. The remote can additionally access a server and retrieve information (e.g., motor operation permissions and/or settings) associated with the unique identifier in response to a retrieval event (e.g., the initiation of a new driving session, etc.). The remote can additionally store motor operation permissions and/or settings. The remote can additionally store historical vehicle use patterns for the user. The remote can additionally measure a vehicle operation parameter (e.g., velocity), and generate control instructions, based on the measurements, that are sent to the vehicle. The remote preferably includes a processor, and can additionally include sensors (e.g., an accelerometer), memory (e.g., flash memory, RAM, etc.), and a user input (e.g., a trigger, roller, slider, touchscreen, etc.). The sensor measurements can alternatively be received by the remote from a user (e.g., input by the user). The remote is preferably capable of sending a first signal to the vehicle and can additionally send a second signal to the vehicle. The first signal is preferably indicative of maximum acceleration in a first direction, and the second signal is preferably indicative of maximum acceleration in a second direction opposing the first (e.g., deceleration or reverse driving). Alternatively, the first and second signals can be indicative of desired velocities. The remote can additionally indicate a cruise state in which no acceleration is desired (e.g., no signal is sent). The remote can additionally be capable of sending a plurality of signals that range from the cruise signal to the first signal and/or second signal, wherein each of the plurality of signals are preferably indicative of an acceleration value between cruise state and maximum acceleration. The remote can additionally include a display (e.g., a digital display, e-ink display, etc.) on which available mode options, driving suggestions, notifications, and/or vehicle operation parameters can be displayed. The remote is preferably configured to be handheld, but can alternatively be configured to be coupled to the board surface, configured to be worn on a user's head, wrist, arm, or have any other suitable form factor. The remote can be a remote specific to the vehicle, a mobile device (e.g., a smartphone), or be any other suitable device that can function as a remote.

Determining a mode selection S500 functions to receive an indicator of a user's expectation of the driving experience. The mode can be manually selected by the user, wherein the mode is preferably received at a user input on the remote. In this variation, at least a first and a second mode option are presented to the user on the display of the remote, wherein the remote preferably receives a user mode selection. Alternatively, the mode can be automatically selected based on a stored history of vehicle use (e.g., driving history) specifically associated with the user. The user history is preferably stored on the remote, but can alternatively be stored on the vehicle or on a server, wherein the user history is preferably associated with a unique user identifier (user ID). The remote preferably determines the appropriate mode based on the user mode selection, but the vehicle or server can alternatively determine the appropriate mode based on the user history. When the user history is stored on the server, the remote and/or vehicle preferably accesses the user history stored on the server each time a mode selection is to be determined, but can alternatively sync with the server at predetermined frequencies. Alternatively, the mode can be automatically selected based on substantially instantaneous vehicle operation measurements, wherein the vehicle operation measurements are preferably mapped to an estimated user expertise and the mode is preferably selected to substantially match the estimated expertise of the user. For example, if weight is detected on the vehicle, the wheels are detected to subsequently turn, and weight is detected to be removed from the vehicle within a threshold period of time (e.g., the user has slipped off), then a mode that brakes the wheels during mounting can be selected. The mode in which the vehicle is operated is preferably determined based on the estimated expertise of the user, wherein the user must have met a mode advancement requirement to progress to successive modes. The mode advancement requirement can be a threshold number of driving hours (e.g., number of hours the user has driven the vehicle), an action performed by the user (e.g., a trick or driving the vehicle at a given speed for a given period of time, etc.), or any other suitable requirement indicative of increased user expertise with the vehicle. The mode advancement requirement can be displayed or presented in another manner to the user prior to achievement of the mode advancement requirement. The automatically selected mode can be one of a set of substantially discrete modes (e.g., beginner, intermediate, and advanced modes), or can be one selected from a continuum of modes, wherein the continuum of modes is preferably achieved by gradually adjusting each of a plurality of vehicle operation parameters from settings associated with inexperienced users to settings associated with experienced users.

Determining the vehicle parameter settings associated with the mode selection S600 functions to map received input signals to the appropriate interpretations of the vehicle parameters, depending on the mode. The vehicle operation parameter setting is preferably a limit (e.g., threshold), such as a limit on the vehicle velocity, vehicle acceleration, motor rotational velocity, motor rotational acceleration, or any other suitable performance parameter. Alternatively, the vehicle operation parameter setting can be a constant parameter value, such as a constant rate of acceleration change. Alternatively, the vehicle operation parameter setting can be an operation parameter threshold at which a vehicle operation feature is applied, such as when and how much torque control should be applied to a slipping wheel, how much uphill drive assist should be provided, how much downhill braking should be applied, whether cruise control can be used. Determining the vehicle parameter settings associated with the mode selection preferably includes retrieving stored parameter settings associated with the selected mode, wherein the settings can be retrieved from the remote, vehicle, or a server. Alternatively, determining the vehicle parameter settings can include calculating the vehicle parameter settings, empirically determining the vehicle operation settings (e.g., empirically determining the acceleration rate for a user that accommodates for the user's weight, given a desired velocity), or be determined in any other suitable manner. Determining the vehicle parameter settings associated with the mode selection preferably includes mapping a set of input signals to different signal interpretations.

In one example, the selected mode is different from the substantially instantaneous mode, wherein the instantaneous mode preferably has a first acceleration maximum and the selected mode has a second acceleration maximum. The motor response to the maximum acceleration signal is preferably reassigned to the second acceleration maximum, wherein the acceleration signals between the maximum acceleration signal and signal for no acceleration are reassigned to acceleration values between the second acceleration maximum and zero acceleration. The different acceleration values assigned to each successive acceleration signal are preferably evenly distributed, but can alternatively be logarithmically distributed or have any other suitable distribution. In another example, the signal indicative of a maximum acceleration in a first direction can be mapped to a first acceleration in a beginner mode and mapped to a second acceleration in an expert mode, wherein the first acceleration is slower than the second acceleration. In another example, when a signal indicative of a maximum acceleration is received, the vehicle accelerates to and is held at a maximum velocity when the beginner mode is selected, despite subsequent received maximum acceleration signals, while the vehicle preferably keeps accelerating at the allowed acceleration when the expert mode is selected in response to subsequent received maximum acceleration signals. In another example, the signal indicative of acceleration in a second direction opposing the first direction can be mapped to a first acceleration change rate (jerk) in the beginner mode and mapped to a second acceleration change rate in the expert mode, wherein the first acceleration change rate is slower than the second acceleration change rate.

Figure 13:
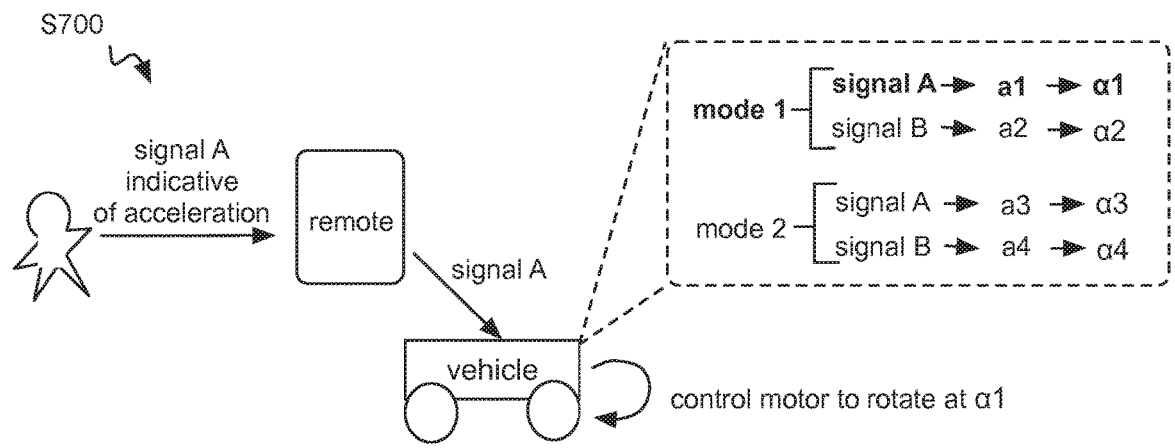
FIG. 13 is a schematic representation of a variation of controlling the operation parameters of the motor based on the determined vehicle parameter settings.
Figure 14:
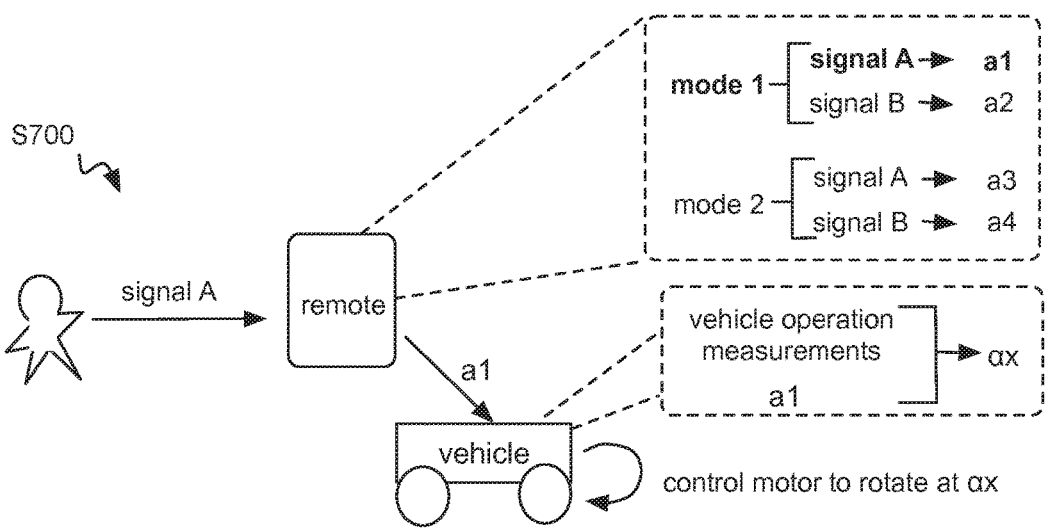
FIG. 14 is a schematic representation of a second variation of controlling the operation parameters of the motor based on the determined vehicle parameter settings.

Controlling the motor operation parameters based on the vehicle parameter settings S700 functions to operate the vehicle in a manner that satisfies the vehicle parameter settings. Controlling the motor operation parameters preferably includes generating motor control instructions from the vehicle parameter settings (based on the selected mode) and controlling the motor based on the motor control instructions. The motor control instructions are preferably generated based on a received user input and the determined vehicle parameter settings. The motor control instructions can additionally be generated based on sensor measurements from the vehicle and/or remote (e.g., vehicle parameter measurements). The motor control instructions are preferably generated by the vehicle as shown in FIGS. 13 and 14, but can alternatively be generated by the remote and sent to the vehicle, wherein substantially instantaneous motor operation parameter measurements are sent to the remote for use in instruction generation at a predetermined frequency, as motor operation parameter changes occur, or in response to any other suitable event. Motor operation is preferably controlled by the vehicle, more preferably by the motor controllers. However, the remote or any other suitable component can control motor operation.

In one example, the vehicle operation parameter setting includes a vehicle velocity limitation and a maximum acceleration rate. In response to the receipt of a maximum acceleration signal, the motor is preferably controlled to rotate at the maximum angular acceleration permitted by the maximum acceleration rate until the velocity limit is reached (e.g., as determined from an accelerometer). The motor acceleration is preferably then controlled to substantially maintain the vehicle velocity at the velocity limit as long as the signal indicative of maximum acceleration is received.

In another example, the vehicle operation parameter setting permits downhill braking and a maximum downhill velocity. In response to the receipt of a maximum acceleration signal, the motor is preferably controlled to limit the vehicle velocity to the maximum downhill velocity by applying motor braking to the wheels. Motor braking is preferably applied by ceasing or reducing current provision to the motor, or by driving the motor in reverse.

In another example, the vehicle operation parameter includes uphill assistance and a maximum vehicle velocity setting or a target velocity set by cruise control (e.g., the instantaneous vehicle velocity when a cruise control signal is received, wherein the vehicle velocity can be achieved by motor-assisted propulsion or by propulsion from a user-generated force). In response to the receipt of a maximum acceleration signal or a cruise control signal, the motor is preferably controlled to accelerate to and maintain the maximum or target velocity (e.g., as determined from an accelerometer). Any acceleration limits are preferably ignored during uphill assistance, when the angle of the vehicle support platform is determined to be at an angle to the perpendicular of a gravity vector.

In another example, the vehicle operation parameter setting includes braking without reverse drive capabilities. In response to the receipt of a maximum acceleration signal in a second direction opposing the first direction (e.g., a reverse direction), the current provided to the motor is preferably gradually decreased to zero, relying on the electromagnetic drag of the rotor on the stator coils to slow the vehicle. When the vehicle velocity reaches zero (e.g., as determined by an accelerometer), subsequent receipt of a maximum acceleration signal in the second direction preferably does not result in vehicle movement.

In an alternative of this example, the vehicle operation parameter setting includes reverse drive capabilities. In response to the receipt of a maximum acceleration signal in a second direction opposing the first direction (e.g., a reverse direction), the current provided to the motor is preferably gradually decreased to zero, relying on the electromagnetic drag of the rotor on the stator coils to slow the vehicle. In response to subsequent receipt of the maximum acceleration signal in the second direction, the motor is preferably driven in reverse (e.g., a current with reversed polarity is applied to the motor). The amount of current applied is preferably limited by a maximum reverse vehicle acceleration value.

In another example, the vehicle operation parameter includes torque control and a threshold difference in wheel rotation rate (e.g., between a first and second wheel). Torque control (e.g., reducing the wheel rotation of a faster spinning wheel to substantially match the rotation of the slower wheel) is preferably applied only when the detected difference in wheel rotation rate meets or exceeds the threshold difference.

Figure 15:
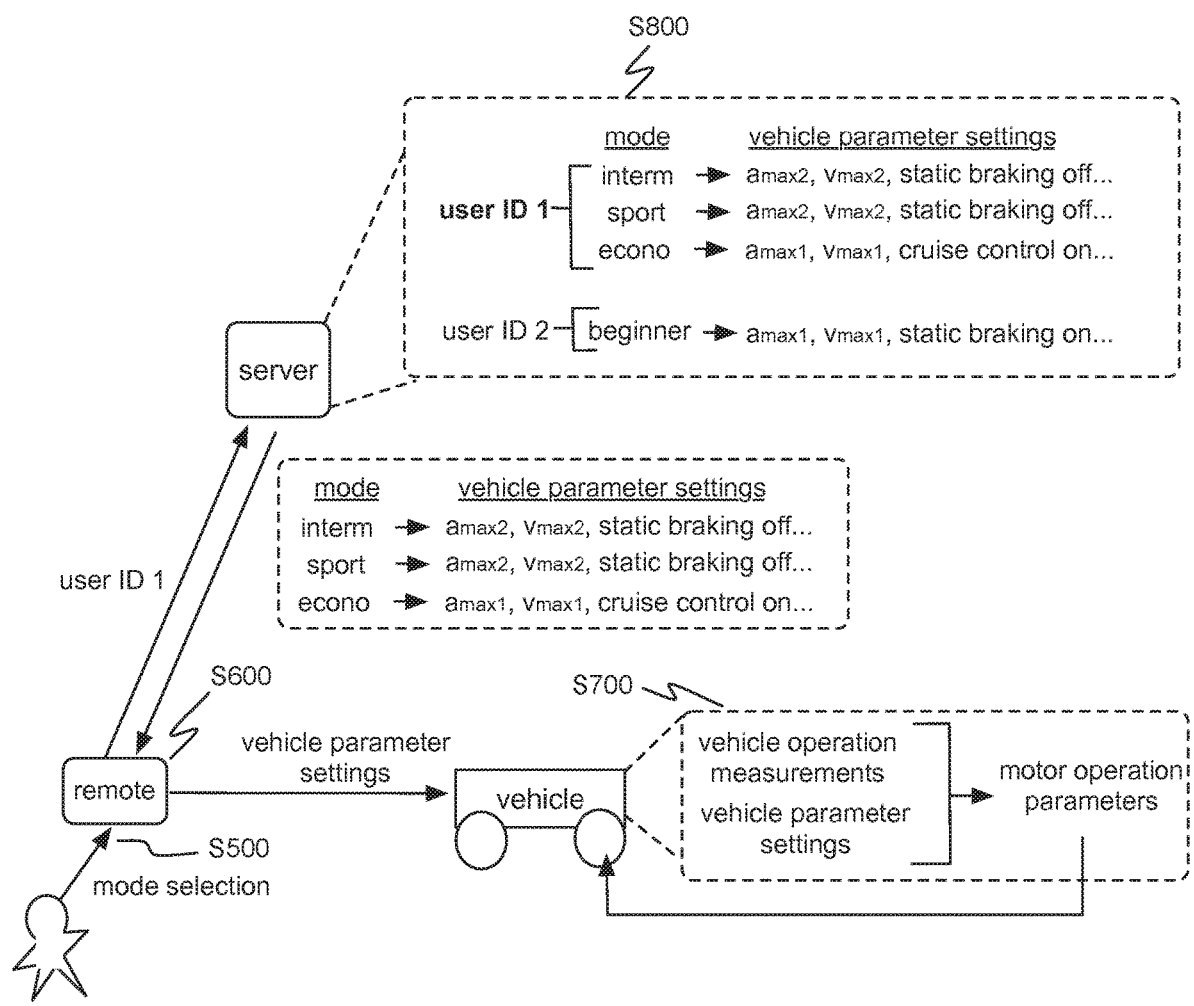
FIG. 15 is a schematic representation of a variation of the method including determining the modes available to a user.

The method can additionally include determining the modes available to a user S800, which functions to restrict the vehicle performance features available to the user. The modes available to the user can be modes permitted based on the user's driving experience, modes purchased by the user, modes unlocked by the user (e.g., by reaching a performance threshold), or any other suitable mode. The available modes can be automatically determined, stored and retrieved from the remote, or stored and retrieved from a server (as shown in FIG. 15). The modes available to the user are preferably additionally presented to the user at a display, wherein a user mode selection is preferably received. Alternatively, the mode can be automatically selected.

Automatically determining the available modes preferably includes accessing the historical driving parameters of the user and determining the vehicle parameter settings based on the combination of historical driving parameters. The vehicle or remote preferably determines the available modes. Alternatively, the server can determine the available modes. The historical driving parameters are preferably stored on the remote, and can be accessed whenever the available mode needs to be determined. Alternatively, the historical driving parameters can be stored on a server, wherein the vehicle or remote retrieves the historical driving parameters associated with a unique user identifier. Alternatively, the vehicle or remote can send the unique user identifier to the server, wherein the server determines and sends the available modes and/or vehicle parameter settings back to the vehicle or remote. The allowed modes, and subsequently, vehicle parameter settings, are preferably determined based on the combination of historical driving parameters associated with the user. Historical driving parameters can include the total driving time, the maximum vehicle operation parameters achieved while driving, the environmental conditions during past driving sessions, or any other suitable parameter. In one variation of the method, a new mode having higher performance vehicle parameter settings is selected with each new driving session, such that the user is gradually introduced to the capabilities of the vehicle. For example, static braking (braking the vehicle prior to complete user mounting) can be gradually relaxed with each subsequent driving session. All vehicle parameter settings can be changed with each new driving session, or the vehicle parameter settings can be independently adjusted with each new driving session. In another variation of the method, a new mode having higher performance vehicle parameter settings is available for user selection after a historical driving parameter value reaches a threshold value. For example, after driving the vehicle 20 miles, an intermediate mode including intermediate vehicle parameter settings can be available to the user.

Retrieving the modes available to a user from a server preferably includes sending a user identifier to the user (e.g., from the remote or the vehicle), wherein the server preferably retrieves and sends the modes associated with the user identifier back to the remote or vehicle. The server can send a mode identifier for the associated modes, wherein the vehicle or remote determines (e.g., retrieves from on-board memory) the vehicle parameter settings associated with each mode. Alternatively, the server can send the vehicle parameter settings for each mode to the remote or vehicle. Each mode is preferably associated with a discrete set of vehicle parameter settings, but can alternatively be associated with vehicle parameter settings that are adjusted based on the user driving history. In one example of the modes available to the user, an economy mode and a sport mode can be associated with the user identifier and accessible to the user. The vehicle parameter settings in the economy mode are preferably selected to minimize power consumption, and the vehicle parameter settings in the sport mode are preferably selected to maximize vehicle performance (e.g., unlimited maximum speed, acceleration limited only by motor capabilities, etc.). In another example, a workout mode and a commuter mode can be available to the user. The vehicle parameter settings in the workout mode are preferably set to minimize motor-assisted driving and/or resisting a driving force applied by the user (e.g., when the user pushes the vehicle forward). The vehicle parameter settings for the commuter mode are preferably set to minimize user-generated force input. However, any other suitable modes with any other suitable vehicle parameter settings can be available to the user.

As a person skilled in the art will recognize from the previous detailed description and from the figures and claims, modifications and changes can be made to the preferred embodiments of the invention without departing from the scope of this invention defined in the following claims.

We claim:

1. A light electric vehicle to support a weight of a user, comprising:
   a support surface to support the weight of a user;
   two or more wheels;
   a rechargeable electric battery mounted i) on the support surface, ii) proximal to the support surface;
   a motor controller containing a processor configured to control operation of an electric motor mounted i) on the support surface, or ii) proximal to the support surface, where the motor controller and its processor are electrically connected to the rechargeable electric battery by wires extending from the rechargeable electric battery to the motor controller, where the electric motor is electrically connected to the motor controller and the rechargeable electric battery, as well as connected to a drive mechanism to drive one or more wheels of the two or more wheels;
   a sensor mounted on the light electric vehicle to provide sensor measurements on motor operation to the motor controller containing the processor, where the processor is configured to record and process the sensor measurement;
   a transmitter-receiver on the light electric vehicle configured to connect wirelessly with and communicate data to i) a mobile device of the user and ii) a wireless remote control; and
   a user input device to control one or more of a velocity and an acceleration of the light electric vehicle;
   said remote control comprising a mode selector configured to set a first riding experience mode of vehicle response for the light electric vehicle selected from a plurality of riding experience modes, wherein the first riding experience mode has a first acceleration maximum and a second riding experience mode has a second acceleration maximum;
   said data including a user perturbation notification when a difference between the mobile device acceleration and the light electric vehicle acceleration exceeds a threshold difference.

2. The light electric vehicle of claim 1, where components making up the light electric vehicle including the support surface, the two or more wheels, the rechargeable electric battery, and the electric motor are light enough in weight to be capable of moving the light electric vehicle in response to a propulsion force generated by the user when the user is in a riding position.

3. The light electric vehicle of claim 1, where the mode selector to set the riding experience mode is configured to factor in at least the user's experience level as well as weight of the user in determining the ride experience.

4. The light electric vehicle of claim 1, where the motor controller that controls electric motor operation is connected to both i) sensors that measure motor operation parameters that include at least any of temperature and electrical current, and ii) sensors that measure vehicle operation parameters that include at least any of an acceleration and speed.

5. The light electric vehicle of claim 1, further comprising: any one of a handle and a steering column, where the handle or steering column is configured to control a direction of vehicle translation and a planar rotation of at least one or more wheels, where the handle or steering column is mounted to the light electric vehicle.

6. The light electric vehicle of claim 1, where the user input is a throttle controlled by the user, where the throttle generates an output value sent to the processor of the motor controller.

7. The light electric vehicle of claim 6, where the drive mechanism is a drivetrain connected to at least a first wheel.

8. A method for a light electric vehicle that supports a weight of a user, comprising:
   supplying a support surface to support the weight of a user;
   supplying two or more wheels;
   supplying a rechargeable electric battery mounted i) on the support surface, or ii) proximal to the support surface;
   supplying a motor controller containing a processor configured to control operation of an electric motor mounted i) on the support surface, or ii) proximal to the support surface, where the motor controller and its processor are electrically connected to the rechargeable electric battery by wires extending from the rechargeable electric battery to the motor controller, where the electric motor is electrically connected to the motor controller and the rechargeable electric battery, as well as connected to a drive mechanism to drive one or more wheels of the two or more wheels;

supplying a sensor mounted on the light electric vehicle to provide sensor measurements on motor operation to the motor controller containing the processor, where the processor is configured to record and process the sensor measurement;

supplying a transmitter-receiver on the light electric vehicle configured to connect wirelessly with and communicate data to i) a mobile device of the user and ii) a wireless remote control; and supplying a user input to control one or more of a velocity and an acceleration of the light electric vehicle;

said remote control configured as a mode selector configured to set a first riding experience mode of vehicle response for the light electric vehicle selected from a plurality of riding experience modes, wherein the first riding experience mode has a first acceleration maximum and a second riding experience mode has a second acceleration maximum;

said data including a user perturbation notification when a difference between the mobile device acceleration and the light electric vehicle acceleration exceeds a threshold difference.

9. The method for the light electric vehicle of claim 8, where components making up the light electric vehicle including the support surface, the two or more wheels, the rechargeable electric battery, and the electric motor are light enough in weight to be capable of moving the light electric vehicle in response to a propulsion force generated by the user when the user is in a riding position.

10. The method for the light electric vehicle of claim 8, where the mode selector to set the riding experience mode is configured to factor in at least the user's experience level as well as weight of the user in determining the ride experience.

11. The method for the light electric vehicle of claim 10, where the motor controller that controls electric motor operation is connected to both i) sensors that measure motor operation parameters that include at least any of temperature and electrical current, and ii) sensors that measure vehicle operation parameters that include at least any of an acceleration and speed.

12. The method for the light electric vehicle of claim 11, further comprising:

supplying any one of a handle and a steering column where the handle or steering column is configured to control a direction of vehicle translation and a planar rotation of at least one or more wheels, where the handle or steering column is mounted to the light electric vehicle.

13. The method for the light electric vehicle of claim 12, where the user input is a throttle controlled by the user, where the throttle generates an output value sent to the processor of the motor controller.

14. The method for the light electric vehicle of claim 13, where the drive mechanism is a drivetrain connected to at least a first wheel.

* * * * *